(12) United States Patent
Watanabe

(10) Patent No.: US 7,960,499 B2
(45) Date of Patent: Jun. 14, 2011

(54) PROCESS FOR PRODUCING CONDUCTIVE POLYMER DISPERSION AND CONDUCTIVE POLYMER DISPERSION

(75) Inventor: Jiro Watanabe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 96 days.

(21) Appl. No.: 12/304,499

(22) PCT Filed: Jun. 12, 2007

(86) PCT No.: PCT/JP2007/061766
§ 371 (c)(1),
(2), (4) Date: Dec. 12, 2008

(87) PCT Pub. No.: WO2007/145185
PCT Pub. Date: Dec. 21, 2007

(65) Prior Publication Data
US 2009/0121194 A1    May 14, 2009

(30) Foreign Application Priority Data

Jun. 12, 2006 (JP) ................................. 2006-162453
Jun. 12, 2006 (JP) ................................. 2006-162454
Jun. 12, 2006 (JP) ................................. 2006-162455

(51) Int. Cl.
*C08G 73/00* (2006.01)
(52) U.S. Cl. ............... 528/422; 252/500; 524/236
(58) Field of Classification Search ............ 252/500; 528/422; 524/236
See application file for complete search history.

(56) References Cited

U.S. PATENT DOCUMENTS

| | | | |
|---|---|---|---|
| 5,519,111 A * | 5/1996 | MacDiarmid et al. ....... | 528/422 |
| 5,567,355 A | 10/1996 | Wessling et al. | |
| 5,720,903 A | 2/1998 | Wessling et al. | |
| 6,099,756 A | 8/2000 | Angelopoulos et al. | |
| 2005/0145832 A1 | 7/2005 | Wessling et al. | |
| 2005/0218381 A1 * | 10/2005 | Maruyama et al. ........... | 252/500 |

FOREIGN PATENT DOCUMENTS

| | | |
|---|---|---|
| EP | 1553142 A2 | 7/2005 |
| JP | 01-139783 A | 6/1989 |
| JP | 2-500918 T | 3/1990 |
| JP | 08-120195 A | 5/1996 |
| JP | 8-510275 T | 10/1996 |
| JP | 11-506497 T | 6/1999 |
| JP | 11-347388 * | 12/1999 |
| JP | 3583427 | 8/2004 |
| JP | 2005194528 A | 7/2005 |
| WO | WO-02/065484 A1 | 8/2002 |
| WO | WO-2005/070972 A1 | 8/2005 |
| WO | WO-2006/092292 A1 | 9/2006 |

OTHER PUBLICATIONS

Machine translation of JP 11-347388.*
Xinyu Zhang, Roch Chan-Yu-King et al., "Nanofiber of polyaniline synthesized by interfacial polymerization," Synthetic Metals, 145 (2004), pp. 23-29.
Zhang D. et al.: "Synthesis and applications of one-dimensional nano-structured polyaniline: An overview"; Materials Science and Engineering B, Elsevier Sequoia, Lausanne, CH LNKD-DOI: 10.106/J.MSEB.2006.07.037, vol. 134, No. 1, Sep. 25, 2006, pp. 9-19.
Nagaoka, T. et al.: "Electrochemical Characterization of Soluble Conducting Polymers as Ion Exchangers"; Analytical Chemistry, vol. 69, No. 6, Mar. 15, 1997, pp. 1030-1037.
Kolla, H.S. et al.: "Absolute Molecular Weight of Polyaniline"; Journal of the American Chemical Society, vol. 127, No. 48, Nov. 11, 2005, pp. 16770-16771.

* cited by examiner

*Primary Examiner* — Harold Y Pyon
*Assistant Examiner* — Haidung D Nguyen
(74) *Attorney, Agent, or Firm* — Connolly Bove Lodge & Hutz LLP

(57) ABSTRACT

It is intended to provide a conductive polymer dispersion which has an excellent conductivity and is capable of providing a material with high transparency; and a process for producing the same. The process for producing a conductive polymer dispersion comprises a stirring step in which a mixed liquid containing a conductive polymer having a weight-average molecular weight of from 20,000 to 1,000,000 and a solvent is stirred at a shearing rate of 10,000 $s^{-1}$ or higher using a stirring machine thereby obtaining a conductive polymer dispersion in which the conductive polymer is dispersed in the solvent.

9 Claims, 3 Drawing Sheets

PROCESS FOR PRODUCING CONDUCTIVE POLYMER DISPERSION AND CONDUCTIVE POLYMER DISPERSION

CROSS REFERENCE TO RELATED APPLICATIONS

This application is a national phase of PCT/JP2007/061766, filed on Jun. 12, 2007, which claims priority to JP 2006-162453, filed on Jun. 12, 2006, JP 2006-162454, filed on Jun. 12, 2006, and JP 2006-162455, filed on Jun. 12, 2006, the entire contents of which are incorporated herein by reference in their entireties.

TECHNICAL FIELD

The invention relates to a process for synthesizing a conductive polymer (process for producing a fibrillar conductive polymer), the conductive polymer (the fibrillar conductive polymer), a process for producing a conductive polymer dispersion, the conductive polymer dispersion (fibrillar conductive polymer dispersion), a process for producing a conductive coating, and the conductive coating.

BACKGROUND ART

Transparent materials having high conductivity are required for touch panels, antistatic agents and other electronic members.

A method commonly adopted for providing such conductive materials is one using vapor deposition of indium tin oxide (ITO) on a substrate made of a PET film or the like. However, the method of vapor-depositing the ITO layer requires a large-scale device and involves comparatively high costs. In addition, in the case of using for a variety of packaging materials as in deep drawing using vacuum forming, for example, the ITO layer could not follow the deformation of the substrate, causing cracks.

An exemplary general-purpose conductive polymer material is polyaniline, but polyaniline is very high in cohesive force and extremely low in dispersibility in solvents, and has therefore had difficulty in striking a good balance between uniformity/transparency with which it can be applied to the film and conductivity.

A process for producing a dispersible, intrinsically conductive polyaniline powder is known in which the polyaniline powder is sheared in the presence of a polar solvent leading to increased conductivity (see Patent Document 1).

A method of producing a conductive path by arranging very thin fibrils of a conductive polymer has been come up with in order to strike a good balance between transparency and conductivity, and a large number of literatures have recently been reported on the conductive polymer in the form of nanofibers (see for example Non-Patent Document 1). Non-Patent Document 1 describes that fibrillar polyaniline is obtained by polymerizing aniline in a stationary state at the interface between an organic solvent and water.
Patent Document 1: JP 3583427 B
Non-Patent Document 1: Xinyu Zhang, Roch Chan-Yu-King et al., "Nanofiber of polyaniline synthesized by interfacial polymerization", Synthetic Metals, 145 (2004), 23-29.

DISCLOSURE OF THE INVENTION

Problems to be Solved by the Invention

However, the mechanism of conductivity increase is not exactly known in the process described in Patent Document 1, although it is presumed that the conductivity increases owing to the removal of dirt on the polyaniline surface. In addition, this process could not achieve a good balance between transparency and conductivity because the polyaniline powder does not dissolve in any polar solvent.

The process described in Non-Patent Document 1 is a process used on a laboratory scale and it is difficult to industrially produce conductive polymer fibrils of the same shape.

Accordingly, a first object of the present invention is to provide a conductive polymer dispersion capable of providing a material having good conductivity and high transparency as well as its production process.

A second object of the present invention is to provide a conductive polymer capable of providing a material having good conductivity and high transparency as well as a conductive polymer synthesis process with which the conductive polymer may be industrially produced.

A third object of the present invention is to provide a conductive polymer dispersion capable of providing a material having good conductivity and high transparency as well as a conductive polymer dispersion production process with which the conductive polymer dispersion may be industrially produced.

A fourth object of the present invention is to provide a fibrillar conductive polymer capable of providing a material having good conductivity and high transparency as well as a fibrillar conductive polymer production process with which the fibrillar conductive polymer may be industrially produced.

A fifth object of the present invention is to provide a fibrillar conductive polymer dispersion capable of providing a material having good conductivity and high transparency.

A sixth object of the present invention is to provide a conductive coating capable of providing a material having good conductivity and high transparency as well as a conductive coating production process with which the conductive coating may be industrially produced.

Means to Solve the Problems

The inventor of the present invention has made an inventive study to achieve the first object and as a result found that a conductive polymer dispersion obtained by stirring with an agitator a liquid mixture containing a conductive polymer having a weight-average molecular weight of 20,000 to 1,000,000 and a solvent at a shear rate of at least 10,000 s$^{-1}$ can provide a material having good conductivity and high transparency.

The inventor of the present invention has made an intensive study to achieve the second object and as a result found that a conductive polymer synthesis process in which a monomer making up a conductive polymer is polymerized as a liquid mixture containing the monomer, an oxidant and water is stirred at a shear rate of at least 5,000 s$^{-1}$ to synthesize the conductive polymer, is capable of industrially producing the conductive polymer that can provide a material having good conductivity and high transparency.

The inventor of the present invention aiming to achieve the third object has found that a conductive polymer dispersion production process in which a monomer making up a conductive polymer is polymerized as a liquid mixture containing the monomer, an oxidant, water, a water-insoluble solvent, and an anionic surfactant is stirred at a shear rate of at least 5,000 s$^{-1}$ to synthesize the conductive polymer, then the water and the components dissolved in the water are removed from the synthesized conductive polymer to obtain a conductive polymer dispersion, is capable of industrially producing the conductive polymer dispersion that can provide a material having good conductivity and high transparency.

The inventor of the present invention has made an intensive study to achieve the fourth and fifth objects and as a result found that a fibrillar conductive polymer with a fibril diameter of not more than 100 nm as obtained by stirring with an agitator a liquid mixture containing conductive polymer aggregates and a solvent as well as a fibrillar conductive polymer dispersion having the fibrillar conductive polymer dispersed in the solvent can provide a material having good conductivity and high transparency.

The inventor of the present invention has made an intensive study to achieve the sixth object and as a result found that (i) a conductive coating having a fibrillar conductive polymer with a fibril diameter of up to 100 nm and a binder dispersed in a solvent and obtained by stirring with an agitator a liquid mixture containing conductive polymer aggregates, the binder and the solvent, (ii) a conductive coating having a fibrillar conductive polymer and a binder dispersed in a solvent and obtained by stirring with an agitator a liquid mixture containing conductive polymer aggregates with a weight-average molecular weight of 20,000 to 1,000,000, the binder and the solvent at a shear rate of at least 10,000 s$^{-1}$, and (iii) a conductive coating having a fibrillar conductive polymer and a binder dispersed in a solvent and obtained by adding the binder to the fibrillar conductive polymer dispersion described above, can all provide a material having good conductivity and high transparency. The present invention provides a conductive polymer dispersion and a conductive coating achieving a good balance between transparency and conductivity making use of the finding that conductive polymer aggregates can be decomposed into nanosized fibrils by applying an extremely high shear force thereto.

The inventor has completed the present invention based on these findings.

Accordingly, the present invention provides the following (1) to (44).

(1) A process for producing a conductive polymer dispersion comprising a stirring step for stirring with an agitator a liquid mixture containing a conductive polymer with a weight-average molecular weight of 20,000 to 1,000,000 and a solvent at a shear rate of at least 10,000 s$^{-1}$ to obtain the conductive polymer dispersion having the conductive polymer dispersed in the solvent.

(2) The process for producing the conductive polymer dispersion according to (1) above, wherein the conductive polymer comprises polyaniline and/or a polyaniline derivative.

(3) The process for producing the conductive polymer dispersion according to (1) or (2) above, wherein the conductive polymer is not dried.

(4) The process for producing the conductive polymer dispersion according to any one of (1) to (3) above, wherein the content of the conductive polymer in the conductive polymer dispersion is not more than 10 wt %.

(5) The process for producing the conductive polymer dispersion according to any one of (1) to (4) above, wherein the agitator is a high-speed agitator in which a rotary shaft is concentrically provided within a cylindrical agitation vessel and a rotary blade with a slightly smaller diameter than the agitation vessel is attached to the rotary shaft and is rotated at a high speed to stir a liquid mixture so that a cylindrical thin film of the liquid mixture is enlarged on an inner surface of the agitation vessel, and wherein the rotary blade has, on its circumferential side, a porous cylindrical portion having a cylindrical body radially perforated with a large number of small holes.

(6) The process for producing the conductive polymer dispersion according to any one of (1) to (5) above, wherein the liquid mixture contains a surfactant.

(7) The process for producing the conductive polymer dispersion according to any one of (1) to (6) above, comprising, prior to the stirring step, a conductive polymer production step in which a monomer, an oxidant and a solvent are mixed together to polymerize the monomer to thereby obtain the conductive polymer.

(8) A conductive polymer dispersion produced by the process for producing the conductive polymer dispersion according to any one of (1) to (7) above.

(9) A process for synthesizing a conductive polymer which comprises polymerizing a monomer making up the conductive polymer while stirring a liquid mixture containing the monomer, an oxidant and water at a shear rate of at least 5,000 s$^{-1}$, to thereby synthesize the conductive polymer.

(10) The process for synthesizing the conductive polymer according to (9) above, wherein the monomer comprises aniline and/or an aniline derivative.

(11) The process for synthesizing the conductive polymer according to (9) or (10) above, wherein the liquid mixture further contains a binder.

(12) The process for synthesizing the conductive polymer according to any one of (9) to (11) above, wherein stirring is carried out using a high-speed agitator in which a rotary shaft is concentrically provided within a cylindrical agitation vessel and a rotary blade with a slightly smaller diameter than the agitation vessel is attached to the rotary shaft and is rotated at a high speed to stir a liquid mixture so that a cylindrical thin film of the liquid mixture is enlarged on an inner surface of the agitation vessel, and wherein the rotary blade has, on its circumferential side, a porous cylindrical portion having a cylindrical body radially perforated with a large number of small holes.

(13) A conductive polymer produced by the conductive polymer synthesis process according to any one of (9) to (12) above.

(14) A process for producing a conductive polymer dispersion which comprises:

polymerizing a monomer making up a conductive polymer while stirring a liquid mixture containing the monomer, an oxidant, water, a water-insoluble solvent and an anionic surfactant at a shear rate of at least 5,000 s$^{-1}$, to thereby synthesize the conductive polymer; and removing the water and the components dissolved in the water from the synthesized conductive polymer to obtain the conductive polymer dispersion.

(15) The process for producing the conductive polymer dispersion according to (14) above, wherein the monomer comprises aniline and/or an aniline derivative.

(16) The process for producing the conductive polymer dispersion according to (14) or (15) above, wherein the liquid mixture further contains a binder.

(17) The process for producing the conductive polymer dispersion according to any one of (14) to (16) above, wherein stirring is carried out using a high-speed agitator in which a rotary shaft is concentrically provided within a cylindrical agitation vessel and a rotary blade with a slightly smaller diameter than the agitation vessel is attached to the rotary shaft and is rotated at a high speed to stir a liquid mixture so that a cylindrical thin film of the liquid mixture is enlarged on an inner surface of the agitation vessel, and wherein the rotary blade has, on its circumferential side, a porous cylindrical portion having a cylindrical body radially perforated with a large number of small holes.

(18) A conductive polymer dispersion produced by the conductive polymer dispersion production process according to any one of (14) to (17) above.

(19) A process for producing a fibrillar conductive polymer comprising a stirring step for stirring with an agitator a liquid mixture containing conductive polymer aggregates and a solvent to obtain the fibrillar conductive polymer with a fibril diameter of not more than 100 nm.

(20) The process for producing the fibrillar conductive polymer according to (19) above, wherein the conductive polymer has a weight-average molecular weight of 20,000 to 1,000,000.

(21) The process for producing the fibrillar conductive polymer according to (19) or (20) above, wherein the liquid mixture is stirred at a shear rate of at least 10,000 $s^{-1}$ to obtain the fibrillar conductive polymer.

(22) The process for producing the fibrillar conductive polymer according to any one of (19) to (21) above, wherein the conductive polymer comprises polyaniline and/or a polyaniline derivative.

(23) The process for producing the fibrillar conductive polymer according to any one of (19) to (22) above, wherein the conductive polymer aggregates are not dried.

(24) The process for producing the fibrillar conductive polymer according to any one of (19) to (23) above, wherein the content of the conductive polymer aggregates in the liquid mixture is not more than 10 wt %.

(25) The process for producing the fibrillar conductive polymer according to any one of (19) to (24) above, wherein the agitator is a high-speed agitator in which a rotary shaft is concentrically provided within a cylindrical agitation vessel and a rotary blade with a slightly smaller diameter than the agitation vessel is attached to the rotary shaft and is rotated at a high speed to stir a liquid mixture so that a cylindrical thin film of the liquid mixture is enlarged on an inner surface of the agitation vessel, and wherein the rotary blade has, on its circumferential side, a porous cylindrical portion having a cylindrical body radially perforated with a large number of small holes.

(26) The process for producing the fibrillar conductive polymer according to any one of (19) to (25) above, wherein the liquid mixture contains a surfactant.

(27) The process for producing the fibrillar conductive polymer according to any one of (19) to (26) above, comprising, prior to the stirring step, a conductive polymer production step in which a monomer, an oxidant and a solvent are mixed together to polymerize the monomer, thus obtaining the conductive polymer aggregates.

(28) A fibrillar conductive polymer with a fibril diameter of not more than 100 nm obtained by the process for producing the fibrillar conductive polymer according to any one of (19) to (27) above.

(29) A fibrillar conductive polymer dispersion having the fibrillar conductive polymer according to (28) above dispersed in a solvent.

(30) A process for producing a conductive coating comprising a stirring step for stirring with an agitator a liquid mixture containing conductive polymer aggregates, a binder and a solvent to obtain the conductive coating having a fibrillar conductive polymer with a fibril diameter of not more than 100 nm and the binder dispersed in the solvent.

(31) The process for producing the conductive coating according to (30) above, wherein the conductive polymer has a weight-average molecular weight of 20,000 to 1,000,000.

(32) The process for producing the conductive coating according to (30) or (31) above, wherein the liquid mixture is stirred at a shear rate of at least 10,000 $s^{-1}$ to obtain the conductive coating.

(33) A process for producing a conductive coating comprising a stirring step for stirring, with an agitator, a liquid mixture containing conductive polymer aggregates with a weight-average molecular weight of 20,000 to 1,000,000, a binder and a solvent at a shear rate of at least 10,000 $s^{-1}$ to obtain the conductive coating having a fibrillar conductive polymer and the binder dispersed in the solvent.

(34) The process for producing the conductive coating according to any one of (30) to (33) above, wherein the conductive polymer comprises polyaniline and/or a polyaniline derivative.

(35) The process for producing the conductive coating according to any one of (30) to (34) above, wherein the conductive polymer aggregates are not dried.

(36) The process for producing the conductive coating according to any one of (30) to (35) above, wherein the content of the conductive polymer aggregates in the liquid mixture is not more than 10 wt %.

(37) The process for producing the conductive coating according to any one of (30) to (36) above, wherein the agitator is a high-speed agitator in which a rotary shaft is concentrically provided within a cylindrical agitation vessel and a rotary blade with a slightly smaller diameter than the agitation vessel is attached to the rotary shaft and is rotated at a high speed to stir a liquid mixture so that a cylindrical thin film of the liquid mixture is enlarged on an inner surface of the agitation vessel, and wherein the rotary blade has, on its circumferential side, a porous cylindrical portion having a cylindrical body radially perforated with a large number of small holes.

(38) The process for producing the conductive coating according to any one of (30) to (37) above, wherein the liquid mixture contains a surfactant.

(39) The process for producing the conductive coating according to any one of (30) to (38) above, comprising, prior to the stirring step, a conductive polymer production step in which a monomer, an oxidant and a solvent are mixed together to polymerize the monomer, thus obtaining the conductive polymer aggregates.

(40) A process for producing a conductive coating comprising adding a binder to the fibrillar conductive polymer dispersion according to (29) above to obtain the conductive coating having the fibrillar conductive polymer and the binder dispersed in the solvent.

(41) The process for producing the conductive coating according to any one of (30) to (40) above, wherein the binder is at least one member selected from the group consisting of acrylic monomer, acrylic oligomer, polyester and polyurethane.

(42) The process for producing the conductive coating according to any one of (30) to (41) above, wherein the content of the binder is 100 to 3,000 parts by weight with respect to 100 parts by weight of the conductive polymer aggregates.

(43) A conductive coating produced by the conductive coating production process according to any one of (30) to (42) above.

(44) The conductive coating according to (43) above, wherein the conductive coating serves as an antistatic agent.

Effects of the Invention

The conductive polymer dispersion production process according to a first aspect of the present invention is capable of producing a conductive polymer dispersion that can provide a material having good conductivity and high transparency.

The conductive polymer dispersion according to a second aspect of the present invention can provide a material having good conductivity and high transparency.

The conductive polymer synthesis process according to a third aspect of the present invention is capable of industrially producing a conductive polymer that can provide a material having good conductivity and high transparency. The conductive polymer according to a fourth aspect of the present invention can provide a material having good conductivity and high transparency.

The conductive polymer dispersion production process according to a sixth aspect of the present invention is capable of industrially producing a conductive polymer dispersion that can provide a material having good conductivity and high transparency. The conductive polymer dispersion according to a fifth aspect of the present invention can provide a material having good conductivity and high transparency. Only applying and drying the conductive polymer dispersion according to the fifth aspect of the present invention enable a material having good conductivity and high transparency to be obtained, so costs can be reduced compared with a method of vapor-depositing ITO or other material which requires a large-scale device.

The fibrillar conductive polymer according to an eighth aspect of the present invention can provide a material having good conductivity and high transparency. The fibrillar conductive polymer production process according to a seventh aspect of the present invention is capable of industrially producing the fibrillar conductive polymer.

The fibrillar conductive polymer dispersion according to a ninth aspect of the present invention can provide a material having good conductivity and high transparency.

The conductive coating according to a thirteenth aspect of the present invention can provide a material having good conductivity and high transparency. The conductive coating production processes according to tenth to twelfth aspects of the present invention are capable of industrially producing the conductive coating.

Figure 1:
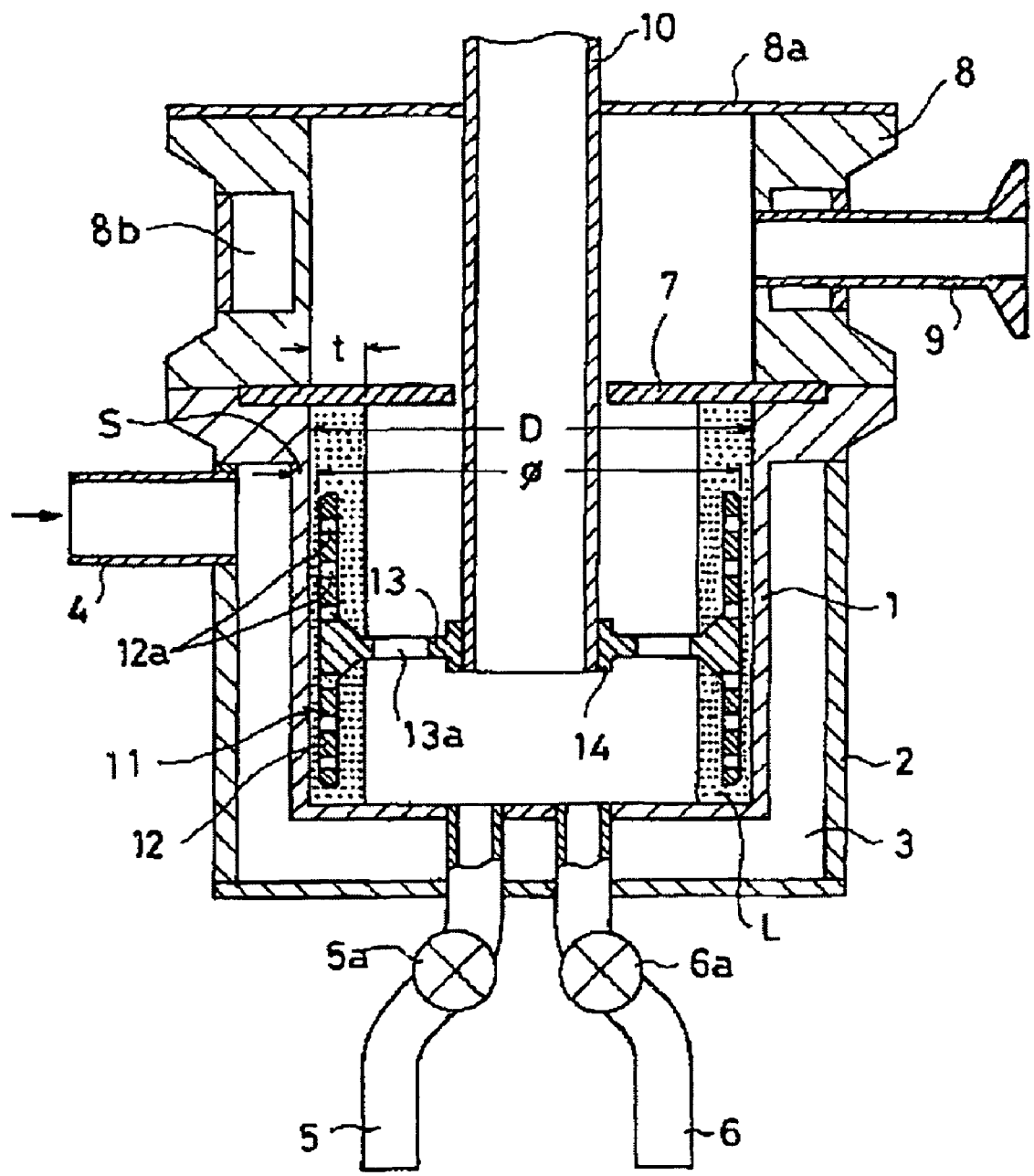
FIG. 1 is a longitudinal sectional view of an example of a high speed agitator.

DESCRIPTION OF SYMBOLS 1 agitation vessel
2 outer vessel
3, 8b cooling water chamber
4 inflow pipe
5, 6 supply pipe
5a, 6a valve
7 shuttering board
8 upper vessel
8a cover
9 outflow pipe
10 rotary shaft
11 rotary blade
12 porous cylindrical portion
12a small hole
13 arm
13a through-hole
14 boss
L liquid mixture
S clearance

BEST MODE FOR CARRYING OUT THE INVENTION

The present invention is described below in further detail.

The first aspect of the invention provides a process for producing a conductive polymer dispersion (hereinafter referred to as the "production process in the first aspect of the invention") including a stirring step for stirring with an agitator a liquid mixture containing a conductive polymer with a weight-average molecular weight of 20,000 to 1,000,000 and a solvent at a shear rate of at least 10,000 $s^{-1}$ to obtain the conductive polymer dispersion having the conductive polymer dispersed in the solvent.

The conductive polymer contained in the liquid mixture is not particularly limited as long as it has a weight-average molecular weight of 20,000 to 1,000,000. Specific examples thereof include polyaniline, polypyrrole, polythiophene, poly(p-phenylene), poly(p-phenylenevinylene) and derivatives thereof. These may be used singly or in combination of two or more thereof. Of these conductive polymers, polyaniline and/or polyaniline derivatives are preferred in terms of general versatility and economic efficiency.

Specific examples of the polyaniline derivatives include poly(methylaniline), poly(dimethylaniline), poly(ethylaniline), and poly(aniline sulfonic acid).

The conductive polymer has a weight-average molecular weight of 20,000 to 1,000,000, and preferably 50,000 to 500,000. At a molecular weight within such range, the conductive polymer included in the resulting conductive polymer dispersion is readily rendered in the form of fibrils (fibers) and is excellent in dispersibility. Therefore, the conductive polymer dispersion can provide a material having good conductivity and high transparency.

The weight-average molecular weight as used herein was measured and calculated by a UV detector using the gel permeation chromatography (GPC) process. Polystyrene was used as the standard sample.

The content of the conductive polymer in the conductive polymer dispersion is preferably not more than 10 wt %, more preferably not more than 5 wt % and even more preferably not more than 2 wt % in terms of ease of dispersion and excellent transparency of the material obtained.

The process for producing the conductive polymer is not particularly limited and any known production process may be used. However, it is generally desirable to use a polymerization method in which polymerization is carried out at a very low temperature (−10° C. or lower) over a long time (about 48 hours). Even at a comparatively high temperature ranging from 0° C. to room temperature, aniline is polymerized in a system containing an anionic surfactant to enable polyaniline having a molecular weight of 20,000 to 1,000,000 to be synthesized. In addition, a synthesis method in which polymerization is carried out at a low temperature for a long time in combination with an anionic surfactant may also be used.

The synthesized conductive polymer is precipitated with methanol or the like, then washed to be dispersed in a solvent, but the conductive polymer following the washing step is preferably not dried. Once it is dried, polyaniline strongly aggregates to deteriorate the dispersibility in solvents. As used herein, "not dried" refers to a state in which the conductive polymer contains a solvent or moisture during the period from the production of the conductive polymer to the stirring step where the conductive polymer is mixed with a solvent. However, moisture (humidity) the conductive polymer spontaneously absorbed from the air is not included.

The solvent contained in the liquid mixture is not particularly limited as long as the solvent used allows dissolution or swelling of at least part of the conductive polymer. Illustrative examples include methyl ethyl ketone (MEK), acetone, methanol, ethanol, isopropanol, toluene, xylene, tetrahydrofuran (THF), dimethyl sulfoxide (DMSO), dimethylformamide (DMF), and N-methyl-2-pyrrolidone (NMP). These may be used singly or in combination of two or more thereof. Of these, toluene and MEK are preferable in terms of solubility and ease of its subsequent removal.

It is preferable for the liquid mixture to further contain a surfactant. When a surfactant is contained, the conductive polymer is readily fibrillated upon stirring the liquid mixture, resulting in improved dispersibility.

Specific examples of the surfactant include nonionic surfactants, anionic surfactants, cationic surfactants, and ampholytic surfactants. These may be used singly or in combination of two or more.

Specific examples of the nonionic surfactant include sorbitan fatty acid ester, polyoxyethylene fatty acid sorbitan, polyoxyethylene higher alcohol ether, polyoxyethylene-propylene higher alcohol ether, polyoxyethylene fatty acid ester, polyoxyethylene alkylphenol, polyoxyethylene alkylamine, and polyoxyethylene-polyoxypropylene block polymer.

Specific examples of the anionic surfactant include alkali metal salts of fatty acids, alkyl sulfates, alkyl ether sulfates, alkyl benzene sulfonates, N-acyl-N-methyl taurates, dialkyl sulfosuccinates, and N-alkyl-N,N-dimethyl oxides.

Specific examples of the cationic surfactant include alkylamine acetates and quaternary ammonium salts such as alkyl trimethyl ammonium chlorides.

Specific examples of the amphoteric surfactant include dimethyl alkyl betaines and alkylamido betaines.

The surfactant is preferably contained in an amount of 0.5 to 2 parts by weight with respect to 100 parts by weight of the conductive polymer because adding an unnecessarily increased amount of surfactant will lower the conductivity.

The liquid mixture may further contain other components than the components described above as long as the effects of the invention are not impaired. Specifically, exemplary other components that may be used include an antioxidant, a thixotropic agent, a flame retardant, an adhesion imparting agent and a tackifier.

The stirring step is a step in which the liquid mixture containing the conductive polymer and the solvent is stirred with an agitator at a shear rate of at least 10,000 s$^{-1}$ to obtain the conductive polymer dispersion having the conductive polymer dispersed in the solvent.

It is said that general mixers for use in resins and rubbers (e.g., kneader, Banbury mixer, roll mill) function at a shear rate ranging from several tens per second to several hundred per second and a homogenizer regarded as a high speed agitator functions at a shear rate reaching a level of several thousand per second, but within such a range, it is very difficult to fibrillate the aggregated conductive polymer.

It is assumed that the conductive polymer aggregates are turned into extremely thin fibrils when a very strong shear force is applied by stirring the liquid mixture at a shear rate of at least 10,000 s$^{-1}$ and as a result, the dispersibility of the conductive polymer in solvent can be improved. On a surface coated with the conductive polymer dispersion, the fibrillar conductive polymer is present uniformly and densely to form a conductive path, so that a material capable of achieving a balance between high transparency and high conductivity is obtained.

The shear rate is preferably at least 15,000 s$^{-1}$, and more preferably at least 25,000 s$^{-1}$ from the viewpoint that the conductive polymer can be dispersed in a shorter time and the conductive polymer dispersion obtained can provide a material capable of achieving a balance between high transparency and high conductivity.

In general, the shear rate ($\gamma$) is represented by the following formula:

$$\gamma = dw/dr$$

wherein w represents the flow velocity and r represents the distance between the places where a difference in the flow velocity occurs. The shear rate indicates a value obtained by dividing the difference in the flow velocity in a sheared state (dw) by the distance (r).

The agitator that may be advantageously used in the invention has a rotary blade inside a vessel (agitation vessel). The rotary blade rotates at a high speed to cause a shear force to be applied between the inner surface of the vessel and the outer surface of the rotary blade, thus leading to disaggregation of the conductive polymer. Take, for example, this agitator, assuming here that the flow velocity near the vessel inner surface and the flow velocity near the outer surface of the rotary blade are identical to the velocities of the vessel and the rotary blade, respectively, the value of dw indicates the velocity of rotation of the rotary blade because the vessel is at rest. The distance r indicates the clearance between the vessel and the rotary blade.

The agitation time may be set as appropriate for the type of agitator, agitation speed and concentration of the liquid mixture so that the effects of the invention may be achieved, but is preferably at least 1 minute and more preferably at least 5 minutes.

Examples of the agitator include ball kneaders such as a ball mill; roll kneaders such as a roll mill, a pressure kneader and an internal mixer; blade kneaders such as a spiral mixer, a planetary mixer and a cutter mixer. However, the agitator is not particularly limited as long as it has such performance as to enable the liquid mixture to be stirred at a shear rate of at least 10,000 s$^{-1}$. Exemplary agitators having such performance include a thin-film spin system high-speed mixer such as FILMICS® available from PRIMIX Corporation, a blade kneader having a disk turbine agitation blade, a high-speed agitator generally called homogenizer, and a jet mixer in which mixing is carried out while a liquid is discharged at a very high rate from a jet nozzle.

A preferable example of such agitator is a high-speed agitator as described in JP 11-347388 A wherein a rotary shaft is concentrically provided within a cylindrical agitation vessel and a rotary blade having a slightly smaller diameter than the agitation vessel is attached to the rotary shaft and is rotated at a high speed to stir a liquid mixture so that a cylindrical thin film of the liquid mixture is enlarged on the inner surface of the agitation vessel and wherein the rotary blade has, on its circumferential side, a porous cylindrical portion in which a cylindrical body is radially perforated with a large number of small holes.

Preferred embodiments of the high-speed agitator are described below with reference to the drawings. It should be noted however that the high-speed agitator is not limited to these embodiments.

Figure 2A:
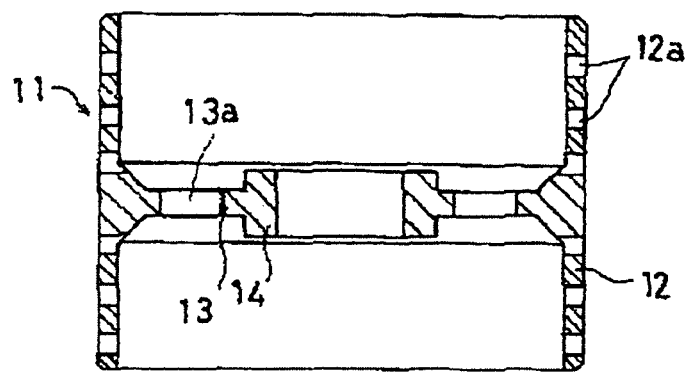
FIG. 2 shows a sectional view, a plan view and a side view of a rotary blade 11.
Figure 2B:
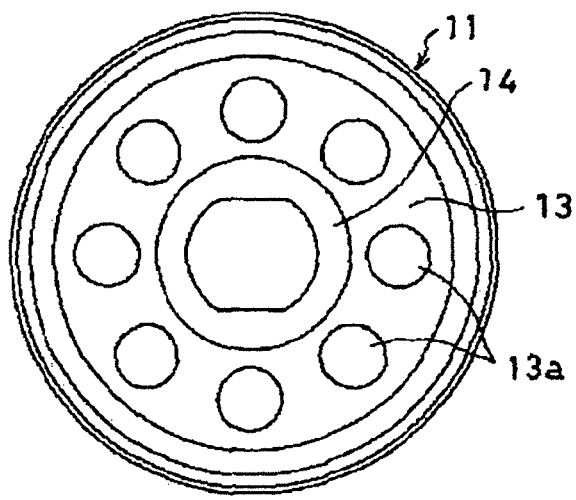
Figure 2C:
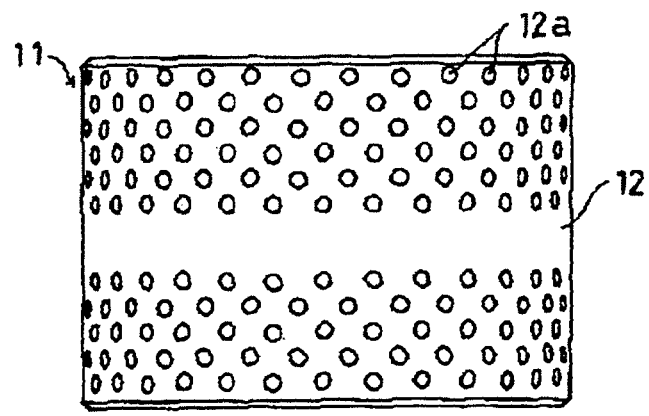

FIG. 1 is a longitudinal sectional view of an example of a high speed agitator. FIG. 2 shows a sectional view (FIG. 2A), a plan view (FIG. 2B) and a side view (FIG. 2C) of a rotary blade 11.

FIG. 1 shows an agitation vessel 1 having a cylindrical section, an outer vessel 2 and a cooling water chamber 3 formed between both the vessels 1 and 2. Cooling water is supplied from an inflow pipe 4 to the cooling water chamber 3, absorbs frictional heat generated by stirring and is discharged from a not-shown outflow pipe. Supply pipes 5 and 6 having valves 5a and 6a, respectively are connected to the bottom of the agitation vessel 1 and used for material supply, and is also used to discharge products in the case of batch production.

At the top of the agitation vessel 1 is disposed a shuttering board 7, on which an upper vessel 8 is attached. The upper vessel 8 is connected to an outflow pipe 9, includes a cover 8a and a cooling water chamber 8b, and is used in continuous production of products. In this case, a plate shown in the drawing as the shuttering board 7 is replaced by one having a larger inside diameter so that a material is continuously supplied from the supply pipes 5 and 6 and stirred liquid continuously exceeds the shuttering board 7 to be discharged. The cooling water chamber 8a is connected in parallel with the cooling water chamber 3 in the channel.

A rotary shaft 10 hermetically passes through the cover 8a to be disposed concentrically with the agitation vessel 1 and is driven at a high speed by a motor provided above. The rotary blade 11 is secured to the lower end of the rotary shaft 10.

As shown in FIGS. 2A, 2B and 2C, the rotary blade 11 includes a porous cylindrical portion 12 on its circumferential side, the porous cylindrical portion 12 being integrated with a boss 14 through an arm 13. The porous cylindrical portion 12 has a large number of small holes 12a radially formed in a cylindrical body except the portion at which the porous cylindrical portion 12 is connected to the arm 13. The arm 13 has an appropriate number of through-holes 13a.

The agitation vessel 1 has an inside diameter D of, for example, 80 mm and the outside diameter φ of the rotary blade 11 is set to a value of about 76 mm or 74 mm which is slightly smaller than the inside diameter D. Therefore, there is a clearance S of 2 mm or 3 mm therebetween. The porous cylindrical portion 12 has a height of 55 mm and a thickness of 3 mm, and the small holes 12a each have a diameter of 3 mm. The rotary blade 11 is driven at a circumferential speed of 25 to 100 m/s or at a higher speed when needed. These numerical values are indicated by way of illustration only and may be changed as appropriate.

High-speed rotation of the rotary blade 11 urges a liquid mixture L to rotate in a circumferential direction. Owing to a centrifugal force generated by this rotation, the liquid mixture is rotated in the shape of a cylindrical thin film as it is in close contact with the inner surface of the agitation vessel 1. Therefore, a deviation due to a difference in speed between its surface and the inner surface of the agitation vessel 1 causes the liquid mixture L to undergo a stirring action so that the included components are pulverized. In addition, the liquid mixture having flowed into the small holes 12a receives a strong torque from the inner surfaces of the small holes and therefore a larger centrifugal force is generated. The liquid mixture L returns the clearance S from the small holes 12a to increase the pressure and perturb the flow of the liquid mixture L within the clearance S, thus promoting the stirring action.

Commercially available products may be used for the above-described high-speed agitator and, for example, FILMICS® manufactured by PRIMIX Corporation may be advantageously used.

In a preferred embodiment, the production process in the first aspect of the invention further includes, prior to the stirring step, a conductive polymer production step in which a monomer, an oxidant and a solvent are mixed together to polymerize the monomer, thus obtaining the conductive polymer. A step for producing polyaniline is now described as a typical example of the conductive polymer production step.

Polyaniline can be obtained by the process that involves first mixing aniline as the monomer, water as the solvent and optionally a surfactant, adjusting pH to about 1 by addition of an acid, then adding ammonium persulfate as the oxidant to carry out oxidative polymerization at a low temperature (of about −35° C. to about 10° C.). It is preferable to subsequently precipitate polyaniline by addition of an appropriate solvent such as methanol, separate the polyaniline by filtration and rinsing the resulting solid with water or the like. The resulting conductive polymer (polyaniline) is preferably used in the stirring step without being dried because fibrils are readily formed and it is excellent in dispersibility.

The monomer is a starting material of the conductive polymer and specific examples thereof include aniline, naphthylamine, phenylenediamine, naphthylenediamine, triaminobenzene, triaminonaphthalene, pyrrole, thiophene, furan, benzene, and derivatives thereof (e.g., a compound in which at least one substituent selected from among an alkyl group having 1 to 30 carbon atoms, an alkoxy group having 1 to 30 carbon atoms, an alkylene oxide group having 1 to 30 carbon atoms, sulfonate group, an alkylene sulfonate group having 1 to 30 carbon atoms is introduced on its aromatic ring). These may be used singly or in combination of two or more thereof.

The oxidant for the oxidative polymerization of the monomer is not particularly limited as long as the compound used may polymerize the monomer. For example, persulfates such as ammonium persulfate, persulfuric acid, sodium persulfate, and potassium persulfate, hydrogen peroxide, ferric chloride, ferric sulfate, potassium dichromate, potassium permanganate, hydrogen peroxide-ferrous salt or other redox initiators are preferably used. These oxidants may be used singly or in combination of two or more thereof.

The amount of oxidant used is not particularly limited as long as the monomer can be oxidatively polymerized, but the oxidant is preferably used in an amount of 0.01 to 10 moles and more preferably 0.1 to 5 moles per mole of the monomer.

The solvent is not particularly limited and may be selected as appropriate for the type of monomer used. Specific examples of the solvent include water, methyl ethyl ketone (MEK), acetone, methanol, ethanol, isopropanol, toluene, xylene, tetrahydrofuran (THF), dimethyl sulfoxide (DMSO), dimethylformamide (DMF), N-methyl-2-pyrrolidone (NMP). These may be used singly or in combination of two or more thereof.

In a preferred embodiment, the monomer is polymerized in the presence of a surfactant in the conductive polymer production step from the viewpoint that the conductive polymer is readily fibrillated in the above-described stirring step.

The above-described exemplary surfactants may be used for the surfactant.

In a preferred embodiment, the monomer is polymerized in the presence of a dopant in the conductive polymer production step from the viewpoint that the resulting conductive polymer can have improved conductivity.

Any dopant may be used without any particular limitation as long as a π-conjugated polymer compound serving as the base of the conductive polymer can be doped. Specific examples thereof include halogen compounds such as iodine, bromine, chlorine, and iodine; protonic acids such as sulfuric acid, hydrochloric acid, nitric acid, perchloric acid, and fluoroboric acid; various salts of these protonic acids; Lewis acids such as aluminum trichloride, iron trichloride, molybdenum chloride, antimony chloride, arsenic pentafluoride, and antimony pentafluoride; organic carboxylic acids such as acetic acid, trifluoroacetic acid, polyethylene carboxylic acid, formic acid, and benzoic acid; various salts of these organic carboxylic acids; phenols such as phenol, nitrophenol, and cyanophenol; various salts of these phenols; organic sulfonic acids such as benzenesulfonic acid, p-toluenesulfonic acid, polyethylenesulfonic acid, p-dodecylbenzenesulfonic acid, alkylnaphthalenesulfonic acid, anthraquinonesulfonic acid, alkylsulfonic acid, dodecylsulfonic acid, camphorsulfonic acid, dioctylsulfosuccinic acid, copper phthalocyanine tetrasulfonic acid, porphyrin tetrasulfonic acid, polystyrene sulfonic acid, polyvinylsulfonic acid, and naphthalenesulfonic acid condensates; various salts of these organic sulfonic acids; polymer acids such as polyacrylic acid; phosphate esters such as propyl phosphate ester, butyl phosphate ester, hexyl phosphate ester, polyethylene oxide dodecyl ether phosphate ester, and polyethylene oxide alkyl ether phosphate ester; various salts of these phosphate esters; sulfate esters such as lauryl sulfate ester, cetyl sulfate ester, stearyl sulfate ester, and lauryl ether sulfate ester; and various salts of these sulfate esters. These may be used singly or in combination of two or more thereof.

Of these dopants, protonic acids, organic carboxylic acids, phenols, organic sulfonic acids, phosphate esters, sulfate esters, and various salts thereof are preferably used. More specifically, hydrochloric acid, nitric acid, benzenesulfonic acid, p-toluenesulfonic acid, p-dodecylbenzenesulfonic acid, alkylnaphthalenesulfonic acid, alkylsulfonic acid, dodecylsulfonic acid, camphorsulfonic acid, dioctylsulfosuccinic acid, polystyrene sulfonic acid, polyvinylsulfonic acid, naphthalenesulfonic acid condensates, and various salts thereof are preferably used.

The dopant is preferably added at a molar ratio (of the dopant to the monomer) of from 0.001 to 15 and more preferably 0.005 to 10.

The above-described production process in the first aspect of the invention is capable of yielding a conductive polymer dispersion that can provide a material having good conductivity and high transparency.

The conductive polymer dispersion in the second aspect of the invention that is produced by the production process in the first aspect of the invention can provide a material having good conductivity and high transparency. A material having good conductivity and high transparency can be obtained by merely applying and drying the conductive polymer dispersion in the second aspect of the invention, so costs can be reduced compared with a method of vapor-depositing ITO or other material which requires a large-scale device.

The conductive polymer dispersion in the second aspect of the invention has the above-described excellent properties and is therefore advantageously used in touch panels, particions in clean rooms, packaging materials of various electronic components, and electronic members in which it serves as an antistatic agent.

The third aspect of the invention provides a process for synthesizing a conductive polymer (hereinafter referred to as the "synthesis process in the third aspect of the invention") which includes polymerizing a monomer making up the conductive polymer while stirring a liquid mixture containing the monomer, an oxidant and water at a shear rate of at least 5,000 $s^{-1}$, to thereby synthesize the conductive polymer.

Specific examples of the monomer that is contained in the liquid mixture and makes up the conductive polymer include aniline, naphthylamine, phenylenediamine, naphthylenediamine, triaminobenzene, triaminonaphthalene, pyrrole, thiophene, furan, benzene, and derivatives thereof (e.g., a compound in which at least one substituent selected from among an alkyl group having 1 to 30 carbon atoms, an alkoxy group, an alkylene oxide group, sulfonate group, an alkylene sulfonate group is introduced on its aromatic ring). These may be used singly or in combination of two or more thereof.

Of these, aniline and/or aniline derivatives are preferred in terms of general versatility and economic efficiency.

The oxidant for the oxidative polymerization of the monomer is not particularly limited as long as the compound used may polymerize the monomer. For example, persulfates such as ammonium persulfate, persulfuric acid, sodium persulfate, and potassium persulfate, hydrogen peroxide, ferric chloride, ferric sulfate, potassium dichromate, potassium permanganate, hydrogen peroxide-ferrous salt or other redox initiators are preferably used. These oxidants may be used singly or in combination of two or more thereof.

The amount of oxidant used is not particularly limited as long as the monomer can be oxidatively polymerized, but the oxidant is preferably used in an amount of 0.01 to 10 moles and more preferably 0.1 to 5 moles per mole of the monomer.

In a preferred embodiment, the liquid mixture further contains a binder. Further inclusion of a binder in the liquid mixture enables the adhesion of the conductive polymer dispersion to be improved. The conductive polymer obtained by stirring the liquid mixture in the presence of a binder does not readily reaggregate.

The binder is not particularly limited and any known binders for use in conductive coatings may be used. Transparent binders having film formability are preferably used.

Specific examples of the binder include acrylic monomers, acrylic oligomers; synthetic resin binders such as polyester, polyurethane, polyvinyl acetate, polyvinyl chloride, polyvinylidene chloride, styrene-butadiene copolymer, polystyrene, polyethylene, polyethylene oxide, polypropylene, and polycarbonate polyvinyl butyral; and water soluble binders such as gelatin, dextran, polyacrylamide, starch, and polyvinyl alcohol. These may be used singly or in combination of two or more thereof.

Of these, acrylic monomers, acrylic oligomers, polyester resins, and polyurethane resins are preferred in terms of general versatility and adhesion to other materials.

The acrylic monomer is a compound that may be polymerized into an acrylic resin. Specific examples thereof include acrylic ester, methacrylic ester, acrylic acid, methacrylic acid acrylamide, methacrylamide, N-methylolacrylamide, N-methylolmethacrylamide, glycidyl acrylate, glycidyl methacrylate, diethylaminoethyl acrylate, diethylaminoethyl methacrylate, aminoethyl vinyl ether, polyoxyethylene acrylate, and polyoxyethylene methacrylate. These may be used singly or in combination of two or more thereof.

These may be used in combination with acrylonitrile, styrene, α-methylstyrene, alkyl vinyl ether, vinyl chloride, vinyl acetate, vinyl propionate, ethylene or the like.

When the acrylic monomers and/or the acrylic oligomers are used for the binder, a radical initiator is used in combination. Specific examples of the radical initiator include azobisisobutyronitrile, benzoyl peroxide, di-t-butyl peroxide, t-butyl hydroperoxide, and azobisisovaleronitrile.

In a preferred embodiment, the binder is preliminarily dissolved in a solvent. The binder preliminarily dissolved in a solvent exhibits excellent dispersibility when added to the liquid mixture. The solvent is not particularly limited as long as the binder can be dissolved therein, but exemplary solvents include water-insoluble solvents to be described later.

The content of the binder is preferably 10 to 5,000 parts by weight and more preferably 100 to 1,000 parts by weight with respect to 100 parts by weight of the monomer making up the conductive polymer.

In a preferred embodiment, the monomer is polymerized in the presence of a dopant in the synthesis process in the third aspect of the invention from the viewpoint that the conductivity of the resulting conductive polymer may be improved.

Any dopant may be used without any particular limitation as long as a π-conjugated polymer compound serving as the base of the conductive polymer can be doped. Specific examples thereof include halogen compounds such as iodine, bromine, chlorine, and iodine; protonic acids such as sulfuric acid, hydrochloric acid, nitric acid, perchloric acid, and fluoroboric acid; various salts of these protonic acids; Lewis acids such as aluminum trichloride, iron trichloride, molybdenum chloride, antimony chloride, arsenic pentafluoride, and antimony pentafluoride; organic carboxylic acids such as acetic acid, trifluoroacetic acid, polyethylene carboxylic acid, formic acid, and benzoic acid; various salts of these organic carboxylic acids; phenols such as phenol, nitrophenol, and cyanophenol; various salts of these phenols; organic sulfonic acids such as benzenesulfonic acid, p-toluenesulfonic acid, polyethylenesulfonic acid, p-dodecylbenzenesulfonic acid, alkylnaphthalenesulfonic acid, anthraquinonesulfonic acid, alkylsulfonic acid, dodecylsulfonic acid, camphorsulfonic acid, dioctylsulfosuccinic acid, copper phthalocyanine tetrasulfonic acid, porphyrin tetrasulfonic acid, polystyrene sulfonic acid, polyvinylsulfonic acid, and naphthalenesulfonic acid condensates; various salts of these organic sulfonic acids; polymer acids such as polyacrylic acid; phosphate esters such as propyl phosphate ester, butyl phosphate ester, hexyl phosphate ester, polyethylene oxide dodecyl ether phosphate ester, and polyethylene oxide alkyl ether phosphate ester; various salts of these phosphate esters; sulfate esters such as lauryl sulfate ester, cetyl sulfate ester, stearyl sulfate ester, and lauryl ether sulfate ester; and various salts of these sulfate esters. These may be used singly or in combination of two or more thereof.

Of these dopants, protonic acids, organic carboxylic acids, phenols, organic sulfonic acids, phosphate esters, sulfate esters, and various salts thereof are preferably used. More specifically, hydrochloric acid, nitric acid, benzenesulfonic acid, p-toluenesulfonic acid, p-dodecylbenzenesulfonic acid, alkylnaphthalenesulfonic acid, alkylsulfonic acid, dodecylsulfonic acid, camphorsulfonic acid, dioctylsulfosuccinic acid, polystyrene sulfonic acid, polyvinylsulfonic acid, naphthalenesulfonic acid condensates, and various salts thereof are preferably used.

The dopant is preferably added at a molar ratio (of the dopant to the monomer) of from 0.001 to 15 and more preferably 0.005 to 10.

The liquid mixture may further contain other components than the components described above as long as the effects of the invention are not impaired. Specifically, exemplary other components that may be used include an antioxidant, a thixotropic agent, a flame retardant, an adhesion imparting agent and a tackifier.

The conductive polymer in the shape of extremely thin fibrils can be synthesized by polymerizing the monomer while a very strong shear force is applied to the liquid mixture with stirring at a shear rate of at least 5,000 s$^{-1}$. Since the conductive polymer exhibits excellent dispersibility in solvents, a conductive polymer dispersion having the conductive polymer uniformly dispersed in a solvent can be obtained.

Therefore, on a surface coated with the conductive polymer dispersion containing the conductive polymer obtained by the synthesis process in the third aspect of the invention, the conductive polymer is present uniformly and densely in the shape of fibrils to form a conductive path. Accordingly, a material capable of achieving a balance between high transparency and high conductivity is obtained.

The shear rate is preferably at least 10,000 s$^{-1}$, and more preferably at least 15,000 s$^{-1}$ because the conductive polymer can be produced in a shorter time and the thus produced conductive polymer can provide a material capable of achieving a balance between high transparency and high conductivity.

In general, the shear rate ($\gamma$) is represented by the following formula:

$$\gamma = dw/dr$$

wherein w represents the flow velocity and r represents the distance between the places where a difference in the flow velocity occurs. The shear rate indicates a value obtained by dividing the difference in the flow velocity in a sheared state (dw) by the distance (r).

The agitator that may be advantageously used in the invention has a rotary blade inside a vessel (agitation vessel). The rotary blade rotates at a high speed to cause a shear force to be applied between the inner surface of the vessel and the outer surface of the rotary blade, thus leading to disaggregation of the conductive polymer. Take, for example, this agitator, assuming here that the flow velocity near the vessel inner surface and the flow velocity near the outer surface of the rotary blade are identical to the velocities of the vessel and the rotary blade, respectively, the value of dw indicates the velocity of rotation of the rotary blade because the vessel is at rest. The distance r indicates the clearance between the vessel and the rotary blade.

The agitation time may be set as appropriate for the type of agitator, agitation speed and concentration of the liquid mixture so that the effects of the invention may be achieved, but is preferably at least 10 minutes and more preferably at least 30 minutes because the polymerization reaction proceeds.

Examples of the agitator include ball kneaders such as a ball mill; roll kneaders such as a roll mill, a pressure kneader and an internal mixer; blade kneaders such as a spiral mixer, a planetary mixer and a cutter mixer. However, the agitator is not particularly limited as long as it has such performance as to enable the liquid mixture to be stirred at a shear rate of at least 5,000 s$^{-1}$. Exemplary agitators having such performance include a thin-film spin system high-speed mixer such as FILMICS® available from PRIMIX Corporation, a blade kneader having a disk turbine agitation blade, a high-speed agitator generally called homogenizer, and a jet mixer in which mixing is carried out while a liquid is discharged at a very high rate from a jet nozzle.

A preferable example of such agitator is a high-speed agitator as described in JP 11-347388 A wherein a rotary shaft is concentrically provided within a cylindrical agitation vessel and a rotary blade having a slightly smaller diameter than the agitation vessel is attached to the rotary shaft and is rotated at a high speed to stir a liquid mixture so that a cylindrical thin film of the liquid mixture is enlarged on the inner surface of the agitation vessel and wherein the rotary blade has on its circumferential side a porous cylindrical portion in which a cylindrical body is radially perforated with a large number of holes.

Commercially available products may be used for the above-described high-speed agitator and, for example, FILMICS® manufactured by PRIMIX Corporation may be advantageously used.

In the synthesis process in the third aspect of the invention, the acidity of the liquid mixture is set as appropriate for the type of monomer used and is not particularly limited.

For example, when aniline or an aniline derivative is used for the monomer, the liquid mixture preferably has a pH (hydrogen ion exponent) of 1 to 5 and more preferably 1 to 2 in terms of ease with which the polymerization reaction proceeds.

In the synthesis process in the third aspect of the invention, the temperature at which the monomer making up the conductive polymer is polymerized is set as appropriate for the type of monomer used and is not particularly limited.

For example, when aniline or an aniline derivative is used for the monomer, the liquid mixture preferably has a temperature of 0 to 30° C. and more preferably 0 to 15° C. from the viewpoint that a desired conductive polymer is readily obtained by suppressing the side reaction.

The above-described synthesis process in the third aspect of the invention is capable of yielding the conductive polymer in the fourth aspect of the invention that can provide a material having good conductivity and high transparency and may be industrially used because a large amount of conductive polymer can be produced with comparative ease.

The conductive polymer dispersion in the fifth aspect of the invention can provide a material having good conductivity and high transparency.

The synthesis process in the third aspect of the invention yields the conductive polymer dispersion having the conductive polymer uniformly dispersed in water as a solvent. This dispersion can be applied to the substrate without further treatment when used.

Another method is also possible in which a water-insoluble solvent is added to this dispersion to obtain a mixture, then the aqueous layer is removed from the mixture to obtain a conductive polymer dispersion. The conductive polymer dispersion obtained by adding a water-insoluble solvent contains few impurities and the drying time of the dispersion applied can be shortened. Ones to be illustrated below may be used for the water-insoluble solvent.

The conductive polymer in the fourth aspect of the invention has the above-described excellent properties and is therefore advantageously used in touch panels, partitions in clean rooms, packaging materials of various electronic components, antistatic agents and other electronic members.

Then, the conductive polymer dispersion production process according to the sixth aspect of the invention is described.

The sixth aspect of the invention provides a process for producing a conductive polymer dispersion (hereinafter referred to as the "production process in the sixth aspect of the invention") which includes: polymerizing a monomer making up a conductive polymer while stirring a liquid mixture containing the monomer, an oxidant, water, a water-insoluble solvent and an anionic surfactant at a shear rate of at least 5,000 s$^{-1}$, to thereby synthesize the conductive polymer; and removing the water and the components dissolved in the water from the synthesized conductive polymer to obtain the conductive polymer dispersion.

The monomer making up the conductive polymer and the oxidant that may be used in the production process in the sixth aspect of the invention and their amounts of use are the same as in the synthesis process in the third aspect of the invention described above.

The agitator that may be used in the production process in the sixth aspect of the invention is the same as used in the synthesis process in the third aspect of the invention described above.

For the water-insoluble solvent, use may be made of a solvent incompatible with water or a solvent that slightly dissolves in water but separates from water when it is allowed to stand.

According to the production process in the sixth aspect of the invention, because of the combination use of water with the water-insoluble solvent, the liquid mixture which is allowed to stand after synthesis of the conductive polymer separates into the aqueous layer in which impurities such as metal ions generated by the decomposition of the oxidant are dissolved, and the water-insoluble solvent layer in which the conductive polymer is dispersed. The production process in the sixth aspect of the invention removes the aqueous layer (the water and components dissolved in the water) to enable a conductive polymer dispersion with reduced impurities to be efficiently produced.

Specific examples of the water-insoluble solvent include pentane, hexane, octane, cyclohexane, benzene, toluene, heptane, ethylbenzene, methyl ethyl ketone, and acetone naphtha. These may be used singly or in combination of two or more thereof.

There is no particular limitation on the weight ratio of the water to the water-insoluble solvent (water/water-insoluble solvent) in the liquid mixture, but these components can be mixed at a weight ratio of 1/9 to 9/1.

Specific examples of the anionic surfactant include alkyl sulfates, alkyl ether sulfates, alkyl ether carboxylates, α-olefin sulfonates, α-sulfo fatty acid methyl esters, fatty acid esters, fatty acid amides, petroleum sulfates, alkyl benzene sulfonates, alkanesulfonates, phosphate esters, and sulfosuccinates.

The content of the anionic surfactant is preferably 10 to 500 parts by weight with respect to 100 parts by weight of the monomer making up the conductive polymer.

In a preferred embodiment, the liquid mixture further contains a binder. When the liquid mixture further contains a binder, the resulting conductive polymer dispersion can have improved adhesion. The conductive polymer obtained by stirring the liquid mixture in the presence of a binder does not readily reaggregate. The conductive polymer dispersion may be used as the conductive coating in various applications such as an antistatic agent.

The binder may also be added to the conductive polymer dispersion produced by the synthesis process in the third aspect of the invention to obtain a conductive coating.

The binder used and its amount of use are as defined for the above-described synthesis process in the third aspect of the invention.

In a preferred embodiment of the production process in the sixth aspect of the invention, the monomer is polymerized in the presence of a dopant from the viewpoint that the resulting conductive polymer dispersion can have improved conductivity.

The dopant used and its amount of use are as defined for the above-described synthesis process in the third aspect of the invention.

The liquid mixture may further contain other components than the components described above as long as the effects of the invention are not impaired. Specifically, exemplary other components that may be used include an antioxidant, a thixotropic agent, a flame retardant, an adhesion imparting agent and a tackifier.

The conductive polymer in the shape of extremely thin fibrils can be synthesized by polymerizing the monomer while a very strong shear force is applied to the liquid mixture with stirring at a shear rate of at least 5,000 $s^{-1}$. Since the conductive polymer exhibits excellent dispersibility in solvents, the conductive polymer dispersion having the conductive polymer uniformly dispersed in a solvent can be obtained.

Therefore, on a surface coated with the conductive polymer dispersion obtained by the production process in the sixth aspect of the invention, a fibrillar conductive polymer is present uniformly and densely to form a conductive path. Accordingly, a material capable of achieving a balance between high transparency and high conductivity is obtained.

The shear rate is preferably at least 10,000 $s^{-1}$, and more preferably at least 15,000 $s^{-1}$ because the conductive polymer can be produced in a shorter time and the thus produced conductive polymer can provide a material capable of achieving a balance between high transparency and high conductivity.

The acidity, reaction temperature and mixing time of the liquid mixture according to the production process in the sixth aspect of the invention are as defined for the above-described synthesis process in the third aspect of the invention.

The above-described production process in the sixth aspect of the invention is capable of yielding the conductive polymer dispersion in the fifth aspect of the invention that can provide a material having good conductivity and high transparency and may be industrially used because a large amount of conductive polymer dispersion can be produced with comparative ease.

The conductive polymer dispersion in the fifth aspect of the invention can provide a material having good conductivity and high transparency. Only applying and drying the conductive polymer dispersion in the fifth aspect of the invention enable a material having good conductivity and high transparency to be obtained, so costs can be reduced compared with a method of vapor-depositing ITO or other material which requires a large-scale device.

The conductive polymer dispersion in the fifth aspect of the invention has the above-described excellent properties and is therefore advantageously used in touch panels, partitions in clean rooms, packaging materials of various electronic components, antistatic agents and other electronic members.

The process for producing a fibrillar conductive polymer and the fibrillar conductive polymer according to the invention are now described.

<Process for Producing a Fibrillar Conductive Polymer and the Resulting Fibrillar Conductive Polymer>

The seventh aspect of the invention provides a process for producing a fibrillar conductive polymer (hereinafter referred to the "production process in the seventh aspect of the invention") including a stirring step for stirring with an agitator a liquid mixture containing conductive polymer aggregates and a solvent to obtain the fibrillar conductive polymer with a fibril diameter of not more than 100 nm.

The fibrillar conductive polymer obtained by the stirring step preferably has a fibril diameter of not more than 20 nm and more preferably not more than 10 nm. There is no particular limitation on the lower limit of the fibril diameter.

The "fibril diameter" as used herein refers to a diameter of each fibril made from the conductive polymer. The "fibril" refers to each of the filaments making up the fiber. In particular, polyaniline has fibrils that aggregate to form strong aggregates and is difficult to handle because it does not disperse in other polymer or a solvent.

The conductive polymer contained in the liquid mixture is not particularly limited. Specific examples thereof include polyaniline, polypyrrole, polythiophene, poly(p-phenylene), poly(p-phenylenevinylene) and derivatives thereof. These may be used singly or in combination of two or more thereof. Of these conductive polymers, polyaniline and/or polyaniline derivatives are preferred in terms of general versatility and economic efficiency.

The conductive polymer is usually obtained as an amorphous mass except for the case in which a conductive polymer is obtained by a special polymerization method such as the method described in Non-Patent Document 1 (interfacial polymerization). This mass is made of polymer fibers complicatedly entwined with each other and has extremely high cohesion. There has not heretofore been a technique for disentwining the mass into fibrils.

The "conductive polymer aggregate" as used herein refers to a conductive polymer mass into which the conductive polymer fibers as described above are complicatedly entwined.

Specific examples of the polyaniline derivatives include poly(methylaniline), poly(dimethylaniline), poly(ethylaniline), and poly(aniline sulfonic acid).

The conductive polymer preferably has a weight-average molecular weight of 20,000 to 1,000,000, and more preferably 50,000 to 500,000. At a molecular weight within such range, the conductive polymer aggregates are readily fibrillated and are excellent in dispersibility. Therefore, the resulting fibrillar conductive polymer can provide a material having good conductivity and high transparency.

The weight-average molecular weight as used herein was measured and calculated by a UV detector using the gel permeation chromatography (GPC) process. Polystyrene was used as the standard sample.

The content of the conductive polymer aggregates in the liquid mixture is preferably not more than 10 wt %, more preferably not more than 5 wt % and even more preferably not more than 2 wt % in terms of ease of dispersion and excellent transparency of the material obtained.

The process for producing the conductive polymer is not particularly limited and any known production process may be used. However, it is generally desirable to use a polymerization method in which polymerization is carried out at a very low temperature (−10° C. or lower) over a long time (about 48 hours). Even at a comparatively high temperature ranging from 0° C. to room temperature, aniline is polymerized in a system containing an anionic surfactant to enable polyaniline having a molecular weight of 20,000 to 1,000,000 to be synthesized. In addition, a synthesis method in which polymerization is carried out at a low temperature for a long time in combination with an anionic surfactant may also be used.

The synthesized conductive polymer is precipitated with methanol or the like, then washed to be dispersed in a solvent, but the conductive polymer following the washing step is preferably not dried. Once it is dried, polyaniline strongly aggregates to deteriorate the dispersibility in solvents. As used herein, "not dried" refers to a state in which the conductive polymer contains a solvent or moisture during the period from the production of the conductive polymer to the stirring step where the conductive polymer is mixed with a solvent. However, moisture (humidity) the conductive polymer spontaneously absorbed from the air is not included.

The solvent contained in the liquid mixture is not particularly limited as long as the solvent used allows dissolution or swelling of at least part of the conductive polymer. Illustrative examples include methyl ethyl ketone (MEK), acetone, methanol, ethanol, isopropanol, toluene, xylene, tetrahydrofuran (THF), dimethyl sulfoxide (DMSO), dimethylformamide (DMF), and N-methyl-2-pyrrolidone (NMP). These may be used singly or in combination of two or more thereof. Of these, toluene and MEK are preferable in terms of solubility and ease of its subsequent removal.

It is preferable for the liquid mixture to further contain a surfactant. When a surfactant is contained, the conductive polymer is readily fibrillated upon stirring the liquid mixture, resulting in improved dispersibility.

Specific examples of the surfactant include nonionic surfactants, anionic surfactants, cationic surfactants, and ampholytic surfactants. These may be used singly or in combination of two or more.

Specific examples of the nonionic surfactant include sorbitan fatty acid ester, polyoxyethylene fatty acid sorbitan, polyoxyethylene higher alcohol ether, polyoxyethylene-propylene higher alcohol ether, polyoxyethylene fatty acid ester, polyoxyethylene alkylphenol, polyoxyethylene alkylamine, and polyoxyethylene-polyoxypropylene block polymer.

Specific examples of the anionic surfactant include alkali metal salts of fatty acids, alkyl sulfates, alkyl ether sulfates, alkyl benzene sulfonates, N-acyl-N-methyl taurates, dialkyl sulfosuccinates, and N-alkyl-N,N-dimethyl oxides.

Specific examples of the cationic surfactant include alkylamine acetates and quaternary ammonium salts such as alkyl trimethyl ammonium chlorides.

Specific examples of the amphoteric surfactant include dimethyl alkyl betaines and alkylamido betaines.

The surfactant is preferably contained in an amount of 0.5 to 2 parts by weight with respect to 100 parts by weight of the conductive polymer aggregates because adding an unnecessarily increased amount of surfactant will lower the conductivity.

The liquid mixture may further contain other components than the components described above as long as the effects of the invention are not impaired. Specifically, exemplary other components that may be used include a binder, an antioxidant, a thixotropic agent, a flame retardant, an adhesion imparting agent and a tackifier.

The stirring step is a step for stirring with an agitator the liquid mixture containing the conductive polymer aggregates and the solvent to obtain the fibrillar conductive polymer with a fibril diameter of not more than 100 nm.

The conductive polymer aggregates are turned into extremely thin fibrils when a very strong shear force is applied by stirring the liquid mixture and as a result, the dispersibility of the conductive polymer in solvent can be improved. On a surface coated with the conductive polymer dispersion or the conductive coating to be described later, the fibrillar conductive polymer is present uniformly and densely to form a conductive path, so that a material capable of achieving a balance between high transparency and high conductivity is obtained.

In the stirring step, the liquid mixture is preferably stirred at a shear rate of at least 10,000 s$^{-1}$ from the viewpoint that the conductive polymer is readily disaggregated into fibrils. The shear rate is more preferably at least 15,000 s$^{-1}$, and even more preferably at least 25,000 s$^{-1}$ from the viewpoint that the conductive polymer can be dispersed in a shorter time and the fibrillar conductive polymer obtained can provide a material capable of achieving a balance between high transparency and high conductivity.

In general, the shear rate ($\gamma$) is represented by the following formula:

$$\gamma = dw/dr$$

wherein w represents the flow velocity and r represents the distance between the places where a difference in the flow velocity occurs. The shear rate indicates a value obtained by dividing the difference in the flow velocity in a sheared state (dw) by the distance (r).

The agitator that may be advantageously used in the invention has a rotary blade inside a vessel (agitation vessel). The rotary blade rotates at a high speed to cause a shear force to be applied between the inner surface of the vessel and the outer surface of the rotary blade, thus leading to disaggregation of the conductive polymer. Take, for example, this agitator, assuming here that the flow velocity near the vessel inner surface and the flow velocity near the outer surface of the rotary blade are identical to the velocities of the vessel and the rotary blade, respectively, the value of dw indicates the velocity of rotation of the rotary blade because the vessel is at rest. The distance r indicates the clearance between the vessel and the rotary blade.

The agitation time may be set as appropriate for the type of agitator, agitation speed and concentration of the liquid mixture so that the effects of the invention may be achieved, but is preferably at least 1 minute and more preferably at least 5 minutes.

Examples of the agitator include ball kneaders such as a ball mill; roll kneaders such as a roll mill, a pressure kneader and an internal mixer; blade kneaders such as a spiral mixer, a planetary mixer and a cutter mixer. However, the agitator is not particularly limited as long as it has such performance as to enable the liquid mixture to be stirred at a shear rate of at least 10,000 s$^{-1}$. Exemplary agitators having such performance include a thin-film spin system high-speed mixer such as FILMICS® available from PRIMIX Corporation, a blade kneader having a disk turbine agitation blade, a high-speed agitator generally called homogenizer, and a jet mixer in which mixing is carried out while a liquid is discharged at a very high rate from a jet nozzle.

A preferable example of such agitator is a high-speed agitator as described in JP 11-347388 A wherein a rotary shaft is concentrically provided within a cylindrical agitation vessel and a rotary blade having a slightly smaller diameter than the agitation vessel is attached to the rotary shaft and is rotated at a high speed to stir a liquid mixture so that a cylindrical thin film of the liquid mixture is enlarged on the inner surface of the agitation vessel and wherein the rotary blade has, on its circumferential side, a porous cylindrical portion in which a cylindrical body is radially perforated with a large number of small holes.

Commercially available products may be used for the above-described high-speed agitator and, for example, FILMICS® manufactured by PRIMIX Corporation may be advantageously used.

In a preferred embodiment, the production process in the seventh aspect of the invention further includes, prior to the stirring step, a conductive polymer production step in which a monomer, an oxidant and a solvent are mixed together to polymerize the monomer, thus obtaining the conductive polymer aggregates. A step for producing polyaniline is now described as a typical example of the conductive polymer production step.

Polyaniline can be obtained by the process that involves first mixing aniline as the monomer, water as the solvent and optionally a surfactant, adjusting pH to about 1 by addition of an acid, then adding ammonium persulfate as the oxidant to carry out oxidative polymerization at a low temperature (of about −35° C. to about 10° C.). It is preferable to subsequently precipitate polyaniline by addition of an appropriate solvent such as methanol, separate the polyaniline by filtration and rinsing the resulting solid with water or the like. The resulting conductive polymer (polyaniline) is preferably used in the stirring step without being dried because fibrils are readily formed and it is excellent in dispersibility.

The monomer is a starting material of the conductive polymer and specific examples thereof include aniline, naphthylamine, phenylenediamine, naphthylenediamine, triaminobenzene, triaminonaphthalene, pyrrole, thiophene, furan, benzene, and derivatives thereof (e.g., a compound in which at least one substituent selected from among an alkyl group having 1 to 30 carbon atoms, an alkoxy group having 1 to 30 carbon atoms, an alkylene oxide group having 1 to 30 carbon atoms, sulfonate group, alkylene sulfonate group having 1 to 30 carbon atoms is introduced on its aromatic ring). These may be used singly or in combination of two or more thereof.

The oxidant for the oxidative polymerization of the monomer is not particularly limited as long as the compound used may polymerize the monomer. For example, persulfates such as ammonium persulfate, persulfuric acid, sodium persulfate, and potassium persulfate, hydrogen peroxide, ferric chloride, ferric sulfate, potassium dichromate, potassium permanganate, hydrogen peroxide-ferrous salt or other redox initiators are preferably used. These oxidants may be used singly or in combination of two or more thereof.

The amount of oxidant used is not particularly limited as long as the monomer can be oxidatively polymerized, but the oxidant is preferably used in an amount of 0.01 to 10 moles and more preferably 0.1 to 5 moles per mole of the monomer.

The solvent is not particularly limited and may be selected as appropriate for the type of monomer used. Specific examples of the solvent include water, methyl ethyl ketone (MEK), acetone, methanol, ethanol, isopropanol, toluene, xylene, tetrahydrofuran (THF), dimethyl sulfoxide (DMSO), dimethylformamide (DMF), N-methyl-2-pyrrolidone (NMP). These may be used singly or in combination of two or more thereof.

In a preferred embodiment, the monomer is polymerized in the presence of a surfactant in the conductive polymer production step from the viewpoint that the conductive polymer is readily fibrillated in the above-described stirring step.

The above-described exemplary surfactants may be used for the surfactant.

In a preferred embodiment, the monomer is polymerized in the presence of a dopant in the conductive polymer production step because the resulting conductive polymer can have improved conductivity.

Any dopant may be used without any particular limitation as long as a π-conjugated polymer compound serving as the base of the conductive polymer can be doped. Specific examples thereof include halogen compounds such as iodine, bromine, chlorine, and iodine; protonic acids such as sulfuric acid, hydrochloric acid, nitric acid, perchloric acid, and fluoroboric acid; various salts of these protonic acids; Lewis acids such as aluminum trichloride, iron trichloride, molybdenum chloride, antimony chloride, arsenic pentafluoride, and antimony pentafluoride; organic carboxylic acids such as acetic acid, trifluoroacetic acid, polyethylene carboxylic acid, formic acid, and benzoic acid; various salts of these organic carboxylic acids; phenols such as phenol, nitrophenol, and cyanophenol; various salts of these phenols; organic sulfonic acids such as benzenesulfonic acid, p-toluenesulfonic acid, polyethylenesulfonic acid, p-dodecylbenzenesulfonic acid, alkylnaphthalenesulfonic acid, anthraquinonesulfonic acid, alkylsulfonic acid, dodecylsulfonic acid, camphorsulfonic acid, dioctylsulfosuccinic acid, copper phthalocyanine tetrasulfonic acid, porphyrin tetrasulfonic acid, polystyrene sulfonic acid, polyvinylsulfonic acid, and naphthalenesulfonic acid condensates; various salts of these organic sulfonic acids; polymer acids such as polyacrylic acid; phosphate esters such as propyl phosphate ester, butyl phosphate ester, hexyl phosphate ester, polyethylene oxide dodecyl ether phosphate ester, and polyethylene oxide alkyl ether phosphate ester; various salts of these phosphate esters; sulfate esters such as lauryl sulfate ester, cetyl sulfate ester, stearyl sulfate ester, and lauryl ether sulfate ester; and various salts of these sulfate esters. These may be used singly or in combination of two or more thereof.

Of these dopants, protonic acids, organic carboxylic acids, phenols, organic sulfonic acids, phosphate esters, sulfate esters, and various salts thereof are preferably used. More specifically, hydrochloric acid, nitric acid, benzenesulfonic acid, p-toluenesulfonic acid, p-dodecylbenzenesulfonic acid, alkylnaphthalenesulfonic acid, alkylsulfonic acid, dodecylsulfonic acid, camphorsulfonic acid, dioctylsulfosuccinic acid, polystyrene sulfonic acid, polyvinylsulfonic acid, naphthalenesulfonic acid condensates, and various salts thereof are preferably used.

The dopant is preferably added at a molar ratio (of the dopant to the monomer) of from 0.001 to 15 and more preferably 0.005 to 10.

The above-described production process in the seventh aspect of the invention is capable of yielding a fibrillar conductive polymer that can provide a material having good conductivity and high transparency. The production process in the seventh aspect of the invention can easily yield a large amount of fibrillar conductive polymer as compared with the method described in Non-Patent Document 1 and may be industrially used.

The fibrillar conductive polymer in the eighth aspect of the invention that is produced by the inventive production process can provide a material having good conductivity and high transparency.

The fibrillar conductive polymer in the eighth aspect of the invention has the above-described excellent properties and is therefore advantageously used in touch panels, partitions in clean rooms, packaging materials of various electronic components, antistatic agents and other electronic members.

<Fibrillar Conductive Polymer Dispersion>

The ninth aspect of the invention provides a fibrillar conductive polymer dispersion having the above-described fibrillar conductive polymer dispersed in a solvent.

The fibrillar conductive polymer dispersion of the invention may be obtained by the production process in the above-described seventh aspect of the invention. The solvent used may be basically the same as that used in the production process in the seventh aspect of the invention and is preferably a solvent used in the production process in the seventh aspect of the invention.

The content of the fibrillar conductive polymer in the fibrillar conductive polymer dispersion is preferably not more than 10 wt %, more preferably not more than 5 wt % and even more preferably not more than 2 wt % in terms of ease of dispersion and excellent transparency of the material obtained.

The above-described fibrillar conductive polymer dispersion of the invention can provide a material having good conductivity and high transparency. A material having good conductivity and high transparency can be obtained by merely applying and drying the conductive polymer dispersion of the invention, so costs can be reduced compared with a method of vapor-depositing ITO or other material which requires a large-scale device.

The fibrillar conductive polymer dispersion of the invention has the above-described excellent properties and is therefore advantageously used in touch panels, partitions in clean rooms, packaging materials of various electronic components, antistatic agents and other electronic members.

<Conductive Coating Production Process and Conductive Coating>

The tenth aspect of the invention provides a process for producing a conductive coating (hereinafter referred to as the "production process in the tenth aspect of the invention") including a stirring step for stirring with an agitator a liquid mixture containing conductive polymer aggregates, a binder and a solvent to obtain the conductive coating having a fibrillar conductive polymer with a fibril diameter of not more than 100 nm and the binder dispersed in the solvent.

The production process in the tenth aspect of the invention is basically the same as the above-described production process in the seventh aspect of the invention except that a binder is further added to the liquid mixture. Therefore, the conductive polymer aggregates, solvent, agitator, surfactant and the like that may be used in the production process in the tenth aspect of the invention as well as the shear rate are the same as used in the above-described production process in the seventh aspect of the invention.

The binder is not particularly limited and any known binders for use in conductive coatings may be used. Transparent binders having film formability are preferably used.

Specific examples of the binder include acrylic monomers, acrylic oligomers; synthetic resin binders such as polyester, polyurethane, polyvinyl acetate, polyvinyl chloride, polyvinylidene chloride, styrene-butadiene copolymer, polystyrene, polyethylene, polyethylene oxide, polypropylene, and polycarbonate polyvinyl butyral; and water soluble binders such as gelatin, dextran, polyacrylamide, starch, and polyvinyl alcohol. These may be used singly or in combination of two or more thereof.

Of these, acrylic monomers, acrylic oligomers, polyester resins, and polyurethane resins are preferred in terms of general versatility and adhesion.

The acrylic monomer is a compound that may be polymerized into an acrylic resin. Specific examples thereof include acrylic ester, methacrylic ester, acrylic acid, methacrylic acid acrylamide, methacrylamide, N-methylolacrylamide, N-methylolmethacrylamide, glycidyl acrylate, glycidyl methacrylate, diethylaminoethyl acrylate, diethylaminoethyl methacrylate, aminoethyl vinyl ether, polyoxyethylene acrylate, and polyoxyethylene methacrylate. These may be used singly or in combination of two or more thereof.

These may be used in combination with acrylonitrile, styrene, α-methylstyrene, alkyl vinyl ether, vinyl chloride, vinyl acetate, vinyl propionate, ethylene or the like.

When the acrylic monomers and/or the acrylic oligomers are used for the binder, a radical initiator is used in combination. Specific examples of the radical initiator include azobisisobutyronitrile, benzoyl peroxide, di-t-butyl peroxide, t-butyl hydroperoxide, and azobisisovaleronitrile.

In a preferred embodiment, the binder is preliminarily dissolved in a solvent. The binder preliminarily dissolved in a solvent exhibits excellent dispersibility when added to the liquid mixture. The solvent is not particularly limited as long as the binder can be dissolved therein and use may be made of, for example, those as used in the liquid mixture.

The content of the binder is preferably 100 to 3,000 parts by weight with respect to 100 parts by weight of the conductive polymer aggregates.

The liquid mixture may further contain other components than the components described above as long as the effects of the invention are not impaired. Specifically, exemplary other components that may be used include an antioxidant, a thixotropic agent, a flame retardant, an adhesion imparting agent and a tackifier.

The eleventh aspect of the invention provides a process for producing a conductive coating (hereinafter referred to as the "production process in the eleventh aspect of the invention") including a stirring step for stirring, with an agitator, a liquid mixture containing conductive polymer aggregates with a weight-average molecular weight of 20,000 to 1,000,000, a binder and a solvent at a shear rate of at least 10,000 s$^{-1}$ to obtain the conductive coating having a fibrillar conductive polymer and the binder dispersed in the solvent.

The production process in the eleventh aspect of the invention is basically the same as the production process in the tenth aspect of the invention except that the weight-average molecular weight of the conductive polymer aggregates is 20,000 to 1,000,000 and that the liquid mixture is stirred at the shear rate of at least 10,000 s$^{-1}$.

According to the production process in the eleventh aspect of the invention, the fibril diameter of the fibrillar conductive polymer contained in the conductive coating obtained can be usually reduced to 100 nm or less.

The conductive polymer aggregates that may be used in the production process in the eleventh aspect of the invention preferably has a weight-average molecular weight of 20,000 to 1,000,000, and more preferably 50,000 to 500,000. At a molecular weight within such range, the conductive polymer aggregates are readily fibrillated and have improved dispersibility, so that the resulting conductive coating can provide a material having good conductivity and high transparency.

In the stirring step of the production process in the eleventh aspect of the invention, the liquid mixture is stirred at a shear rate of at least 10,000 s$^{-1}$ from the viewpoint that the conductive polymer is readily disaggregated into fibrils. The shear rate is preferably at least 15,000 s$^{-1}$, and more preferably at least 25,000 s$^{-1}$ from the viewpoint that the conductive polymer can be dispersed in a shorter time and the fibrillar conductive polymer obtained can provide a material capable of achieving a balance between high transparency and high conductivity.

The twelfth aspect of the invention provides a process for producing a conductive coating (hereinafter referred to as the "production process in the twelfth aspect of the invention") including adding a binder to the above-described fibrillar conductive polymer dispersion of the invention to obtain the conductive coating having the fibrillar conductive polymer and the binder dispersed in the solvent.

The binder used in the production process in the twelfth aspect of the invention may be the same as that used in the above-described production processes in the tenth and eleventh aspects of the invention, including its content.

There is no particular limitation on the method of dispersing the binder after its addition to the fibrillar conductive polymer dispersion. An exemplary method involves adding the binder to the agitator used to produce the fibrillar conductive polymer dispersion after it has been produced, then dispersing the binder. Alternatively, the binder may be dispersed in other agitator than that used to produce the fibrillar conductive polymer dispersion (e.g., stirrer) or be manually dispersed with a stirring bar.

The conductive coating in the thirteenth aspect of the invention produced by any of the above-described production processes in the tenth to twelfth aspects of the invention can provide a material having good conductivity and high transparency. The production processes in the tenth to twelfth aspects of the invention can produce a large amount of conductive coating with comparative ease and may be industrially used. In addition, when the conductive polymer is stirred with the binder in the stirring step of the production processes in the tenth and eleventh aspects of the invention, the conductive polymer does not readily reaggregate to enable a uniform coating to be obtained.

The conductive coating in the thirteenth aspect of the invention has the above-described excellent properties and is therefore advantageously used in touch panels, partitions in clean rooms, packaging materials of various electronic components, antistatic agents and other electronic members.

The antistatic agent of the invention may be used for example in the form of an antistatic sheet having the antistatic agent applied to the substrate. The antistatic sheet is advantageously used in packaging materials of electronic components and electronic materials; and interior materials such as dressed lumber or curtains used in places where the presence of dust poses a problem as exemplified by medical institutions and clean rooms.

The substrate is not particularly limited but a transparent film is preferably used. Specific examples of the substrate that may be advantageously used include a polyester film, a nylon film, a polyethylene film, and a polypropylene film.

EXAMPLES

The invention is described below in detail by referring to Examples, which do not however limit the invention.

1. Examples in the First and Second Aspects of the Invention

Synthesis of Conductive Polymer

Synthesis Example 1-1

One g of aniline, 6.3 g of dodecylbenzenesulfonic acid and 100 ml of distilled water were mixed together. Then, to this mixture was added all of dilute hydrochloric acid prepared by adding 5.4 ml of 6N hydrochloric acid to 50 ml of distilled water. The mixture was cooled to −10° C., then 2.7 g of ammonium persulfate dissolved in 30 ml of distilled water was added as the oxidant to carry out oxidative polymerization for 30 minutes.

Thereafter, methanol was added to precipitate polyaniline. The solid obtained by filtration was washed with a large amount of distilled water to remove dodecylbenzenesulfonic acid and ammonium persulfate residues to thereby obtain polyaniline.

At the end of filtration, a portion of the polyaniline was taken and dedoped with aqueous ammonia, then dissolved in NMP, and its weight-average molecular weight was measured by GPC. The polyaniline obtained had a weight-average molecular weight of 300,000.

Synthesis Example 1-2

Synthesis Example 1-1 was repeated except that 0.02 g of trimethylaniline was further added to the starting material, thereby synthesizing a conductive polymer.

The conductive polymer obtained by the same method as in Synthesis Example 1-1 was measured for its weight-average molecular weight. The conductive polymer obtained had a weight-average molecular weight of 30,000.

Preparation of Conductive Polymer Dispersion

Examples 1-1 to 1-8 and Comparative Examples 1-1 to 1-3

One of the polyanilines obtained in Synthesis Examples 1 and 2 and commercially available polyaniline (produced by Aldrich; weight-average molecular weight: 10,000), dodecylbenzenesulfonic acid and toluene were mixed at a formulation ratio (parts by weight) shown in Table 1 below, and the mixture was stirred with an agitator shown in Table 1 below at room temperature at a shear rate shown in Table 1 for a mixing time shown in Table 1 to obtain each conductive polymer dispersion.

Each conductive polymer dispersion obtained was spin-coated on a glass plate and dried to form a film with a thickness of 0.5 μm.

In this step, the polyaniline in Example 1-2 was only dried at 80° C. for 3 hours before use whereas the others were used in an undried state. The amount of polyaniline was determined in terms of the weight measured in a dry state.

The conductive polymer film formed on the glass plate was evaluated for its appearance, transparency and conductivity by the methods described below.

The results are shown in Table 1.

(Evaluation of Appearance)

The conductive polymer film was visually observed, and rated "good" when it was uniform, "fair" when a small amount of aggregates remained, and "poor" when many particles of aggregated conductive polymer were seen.

(Evaluation of Transparency)

The total light transmittance of the conductive polymer coated on the glass plate was determined by a haze meter (HM-150 manufactured by Murakami Color Research Laboratory Co., Ltd.).

(Evaluation of Conductivity)

The conductivity of the conductive polymer coated on the glass plate was determined by the 4-terminal method using a resistivity meter (Loresta IP manufactured by Dia Instruments Co., Ltd.)

TABLE 1

|  |  | EX 1-1 | EX 1-2 | EX 1-3 | Ex 1-4 | Ex 1-5 | Ex 1-6 |
|---|---|---|---|---|---|---|---|
| Formulation | Polyaniline in Synthesis Example 1-1 | 1.0 | 1.0 | 1.0 | 1.0 | 1.0 | 5.0 |
|  | Polyaniline in Synthesis |  |  |  |  |  |  |

TABLE 1-continued

|  |  | Example 1-2 |  |  |  |  |  |
|---|---|---|---|---|---|---|---|
|  | Commercial polyaniline |  |  |  |  |  |  |
|  | Dodecylbenzene-sulfonic acid | 0.5 | 0.5 | 0.5 | 0.5 | 0.5 | 0.5 |
|  | Toluene | 98.5 | 98.5 | 98.5 | 98.5 | 98.5 | 94.5 |
|  | Dry state of polyaniline | Undried | Dried | Undried | Undried | Undried | Undried |
|  | Conc. of toluene solution (wt %) | 1 | 1 | 1 | 1 | 1 | 5 |
| Mixing condition | Mixing device | FILMICS FM-80-50 | FILMICS FM-80-50 | FILMICS FM-80-50 | FILMICS FM-80-50 | FILMICS FM-80-50 | FILMICS FM-80-50 |
|  | Circumferential speed (m/s) | 50 | 50 | 30 | 30 | 20 | 50 |
|  | Shear rate ($s^{-1}$) | 25000 | 25000 | 15000 | 15000 | 10000 | 25000 |
|  | Mixing time (min) | 5 | 5 | 5 | 15 | 5 | 5 |
| Result | Appearance | Good | Fair | Fair | Fair | Fair | Good |
|  | Total light transmittance (%) | 85 | 88 | 90 | 89 | 92 | 70 |
|  | Conductivity (S/cm) | 78 | 14 | 0.5 | 1.2 | 0.1 | 84 |

|  |  | Ex 1-7 | Ex 1-8 | CE 1-1 | CE 1-2 | CE 1-3 |
|---|---|---|---|---|---|---|
| Formulation | Polyaniline in Synthesis Example 1-1 | 10.0 |  | 1.0 | 1.0 |  |
|  | Polyaniline in Synthesis Example 1-2 |  | 1.0 |  |  |  |
|  | Commercial polyaniline |  |  |  |  | 1.0 |
|  | Dodecylbenzene-sulfonic acid | 0.5 | 0.5 | 0.5 | 0.5 | 0.5 |
|  | Toluene | 89.5 | 98.5 | 98.5 | 98.5 | 98.5 |
|  | Dry state of polyaniline | Undried | Undried | Undried | Undried | Dried product |
|  | Conc. of toluene solution (wt %) | 10 | 1 | 1 | 1 | 1 |
| Mixing condition | Mixing device | FILMICS FM-80-50 | FILMICS FM-80-50 | FILMICS FM-80-50 | Homogenizer | FILMICS FM-80-50 |
|  | Circumferential speed (m/s) | 50 | 50 | 15 | 3.1 | 50 |
|  | Shear rate ($s^{-1}$) | 25000 | 25000 | 7500 | 3100 | 25000 |
|  | Mixing time (min) | 5 | 5 | 5 | 10 | 5 |
| Result | Appearance | Fair | Good | Fair | Poor | Fair |
|  | Total light transmittance (%) | 61 | 85 | 95 | 95 | 95 |
|  | Conductivity (S/cm) | 83 | 7.3 | 0.005 | 0.001 | 0.0005 |

In Table 1, FILMICS FM-80-50 is T. K. FILMICS manufactured by PRIMIX Corporation and the homogenizer is Ultradisperser LK-21 manufactured by Yamato Scientific Co., Ltd.

Comparative Example 1-4

Dried polyaniline powder (Aldrich reagent with a weight-average molecular weight of 100,000) and NMP were mixed by the method of Example 1 described in Patent Document 1 so that the weight ratio of polyaniline to NMP was 3/1. The mixture was mixed in a ball mill for 5 hours, then dried in vacuo. Thereafter, the mixture was introduced into 100 ml of toluene in such an amount that the polyaniline had a concentration of 1 wt %. Further, 1.7 parts by weight of dodecylbenzenesulfonic acid was added to parts by weight of toluene. The mixture was stirred overnight using a stirrer. The stirred solution was visually observed and as a result it was found that the polyaniline remained aggregated and was not dispersed but precipitated in the toluene.

The resulting mixture was spin-coated on a glass plate and dried to form a film with a thickness of 0.5 μm. The total light transmittance and conductivity of the film was measured by the same methods as above.

As a result, the total light transmittance and the conductivity were 94(%) and $10^{-14}$ (S/cm), respectively.

As is clear from the results shown in Table 1 and Comparative Example 1-4, the conductive polymer dispersions (in Comparative Examples 1-1 and 1-2) obtained by stirring at a shear rate of less than 10,000 $s^{-1}$ could not have sufficiently finely divided conductive polymer and were also low in conductivity. The conductive polymer dispersion (in Comparative Example 1-3) that used polyaniline powder with a weight-average molecular weight of 10,000 was low in conductivity. In the conductive polymer dispersion in Comparative Example 1-4, the conductive polymer was not dispersed but precipitated in toluene and the conductivity was extremely low.

On the other hand, Examples 1-1 to 1-8 exhibited high transparency with good conductivity.

2. Examples in the Third to Sixth Aspects of the Invention

Synthesis of Conductive Polymer

Example 2-1

To 125 parts by weight of distilled water were added 2.3 parts by weight of aniline and 4.1 parts by weight of 6N hydrochloric acid. Then, the mixture was cooled to 5° C. In this mixture was introduced as an oxidant, 6.1 parts by weight of ammonium persulfate dissolved in 30 parts by weight of distilled water. While the mixture was maintained at a temperature of 5° C., it was stirred for 4 hours at a shear rate of 25,000 $s^{-1}$ using an agitator (T. K. FILMICS FM-80-50, manufactured by PRIMIX Corporation) to thereby synthesize polyaniline. The agitation vessel was of a double structure and cooling water was allowed to flow within the vessel so as to maintain the vessel at 5° C. during the reaction.

Thereafter, the dispersion was transferred to a bottle with a capacity of 200 ml and allowed to stand. About 1 week later, polyaniline precipitates began to form on the bottom of the bottle.

Comparative Example 2-1

Polyaniline was synthesized by the same method as in Example 2-1 except that the agitator used was a general-purpose agitator (Three-One Motor BL600 manufactured by HEIDON) and that the shear rate was changed to 120 $s^{-1}$.

The dispersion was allowed to stand under the same conditions as in Example 2-1, whereupon polyaniline precipitates formed in about 2 hours.

The results in Example 2-1 and Comparative Example 2-1 showed that the polyaniline in Example 2-1 was dispersed in a finer state than in Comparative Example 2-1.

Preparation of Conductive Polymer Dispersion

Example 2-2

To 125 parts by weight of distilled water were added 2.3 parts by weight of aniline, 4.1 parts by weight of 6N hydrochloric acid, 150 parts by weight of toluene and 4.0 parts by weight of dodecylbenzenesulfonic acid, after which the mixture was cooled to 5° C. In the mixture was introduced as an oxidant, 6.1 parts by weight of ammonium persulfate dissolved in 30 parts by weight of distilled water. While the mixture was maintained at a temperature of 5° C., it was stirred for 4 hours at a shear rate of 25,000 $s^{-1}$ using an agitator (T. K. FILMICS FM-80-50 manufactured by PRIMIX Corporation) to thereby synthesize polyaniline.

After the end of synthesis, a mixture of 100 parts by weight of water and 50 parts by weight of methanol was added and the whole was transferred to a separatory funnel. The mixture was allowed to stand for about 10 minutes to be separated into the toluene layer in which the polyaniline was dispersed and the aqueous layer. The aqueous layer was removed to obtain a conductive polymer dispersion.

The appearance of the conductive polymer dispersion immediately after its preparation was visually observed. The appearance was rated "good" when the conductive polymer did not precipitate but was dispersed and "poor" when the conductive polymer precipitated. The evaluation results are shown in Table 2 below.

Then, the resulting conductive polymer dispersion was spin-coated on a glass plate and dried to form a film with a thickness of 0.2 µm.

The conductive polymer film formed on the glass plate was evaluated for its transparency and conductivity by the methods described below.

The results are shown in Table 2.

(Evaluation of Transparency)

The total light transmittance of the conductive polymer coated on the glass plate was determined by a haze meter (HM-150 manufactured by Murakami Color Research Laboratory Co., Ltd.).

(Evaluation of Conductivity)

The conductivity of the conductive polymer coated on the glass plate was determined by the 4-terminal method using a resistivity meter (Loresta IP manufactured by Dia Instruments Co., Ltd.)

Example 2-3

A conductive polymer dispersion was prepared by the same method as in Example 2-2 except that the shear rate was changed to 6,000 $s^{-1}$.

The resulting conductive polymer dispersion was evaluated for its appearance, transparency and conductivity by the methods described above. The results are shown in Table 2.

Comparative Example 2-2

A conductive polymer dispersion was prepared by the same method as in Example 2-2 except that the agitator used was a general-purpose agitator (Three-One Motor BL600 manufactured by HEIDON) and that the shear rate was changed to 120 $s^{-1}$.

The resulting conductive polymer dispersion was evaluated for its appearance, transparency and conductivity by the methods described above. The results are shown in Table 2.

[Table 2]

TABLE 2

|  | Example 2-2 | Example 2-3 | Comparative Example 2-2 |
|---|---|---|---|
| Agitator | FILMICS | FILMICS | Three-One Motor |
| Shear rate ($s^{-1}$) | 25,000 | 6,000 | 120 |
| Appearance | Good | Good | Good |
| Total light transmittance (%) | 85 | 79 | 80 |
| Conductivity (S/cm) | 92 | 21 | 0.2 |

As is clear from the results shown in Table 2, polymerization of a polymer at a shear rate of at least 5,000 $s^{-1}$ was found to markedly improve the conductivity.

3. Examples in the Seventh to Thirteenth Aspects of the Invention

Synthesis of Conductive Polymer

Synthesis Example 3-1

One g of aniline, 6.3 g of dodecylbenzenesulfonic acid and 100 ml of distilled water were mixed together. Then, to this mixture was added all of dilute hydrochloric acid prepared by adding 5.4 ml of 6N hydrochloric acid to 50 ml of distilled water. The mixture was cooled to −10° C., then 2.7 g of ammonium persulfate dissolved in 30 ml of distilled water was added as the oxidant to carry out oxidative polymerization for 30 minutes.

Thereafter, methanol was added to precipitate polyaniline. The solid obtained by filtration was washed with a large amount of distilled water to remove dodecylbenzenesulfonic acid and ammonium persulfate residues, after which the solid was stored in a covered bottle without being dried. The measured solid content of the resulting conductive polymer was 20 wt %.

At the end of filtration, a portion of the polyaniline was taken and dedoped with aqueous ammonia, then dissolved in NMP, and its weight-average molecular weight was measured by GPC. The polyaniline obtained had a weight-average molecular weight of 300,000.

Synthesis Example 3-2

Synthesis Example 3-1 was repeated except that 0.02 g of trimethylaniline was further added to the starting material, thereby synthesizing a conductive polymer. The measured solid content of the resulting conductive polymer was 20 wt %.

The conductive polymer obtained by the same method as in Synthesis Example 3-1 was measured for its weight-average molecular weight. The conductive polymer obtained had a weight-average molecular weight of 30,000.

Preparation of Fibrillar Conductive Polymer Dispersion

Synthesis Example 3-3

The conductive polymer in Synthesis Example 3-1 was mixed with toluene at a weight ratio (of the conductive polymer to the toluene) of 5/77.5. The mixture was stirred at room temperature at a shear rate of 25,000 s$^{-1}$ for 5 minutes using T. K. FILMICS manufactured by PRIMIX Corporation to obtain a fibrillar conductive polymer dispersion.

Preparation of Conductive Coating

Examples 3-1 to 3-6 and Comparative Examples 3-1 to 3-2

The respective components shown in Table 3 were mixed at a compositional ratio (parts by weight) shown in Table 3. The mixture was stirred with an agitator (T. K. FILMICS manufactured by PRIMIX Corporation) at room temperature at a shear rate shown in Table 3 for a mixing time shown in Table 3 to obtain each conductive coating.

In order to evaluate the long-term stability of each conductive coating obtained, a portion of it was taken out, sealed and allowed to stand at room temperature for 1 month, then visually observed.

It was rated "good" when no precipitate formed, "fair" when a small amount of precipitate formed and "poor" when a considerably large amount of precipitate formed.

Each conductive coating obtained was spin-coated on a PET film and dried to form a film with a thickness of 0.5 μm.

According to the methods described below, the film formed on the PET film was measured for its fibril diameter and evaluated for its appearance, transparency, conductivity and adhesion.

The results are shown in Table 3.

Example 3-7

Were mixed together 82.5 parts by weight of the fibrillar conductive polymer dispersion in Synthesis Example 3-3 and 17.5 parts by weight of polyester solution and the mixture was manually stirred with a glass rod to obtain a conductive coating.

The resulting conductive coating was evaluated for its long-term stability, fibril diameter, appearance, transparency, conductivity and adhesion by the same methods as in Examples 3-1 to 3-6 and Comparative Examples 3-1 to 3-2.

The results are shown in Table 3.

(Evaluation of Appearance)

The conductive polymer film was visually observed, and rated "good" when it was uniform, "fair" when a small amount of aggregates remained, and "poor" when many particles of aggregated conductive polymer were seen.

(Measurement of Fibril Diameter)

The film formed on the PET film was observed by an optical microscope or a transmission electron microscope (TEM). The fibril diameter of the fibrillar conductive polymer was calculated from the magnification.

(Evaluation of Transparency)

The total light transmittance of the conductive polymer coated on the glass plate was determined by a haze meter (HM-150 manufactured by Murakami Color Research Laboratory Co., Ltd.).

(Evaluation of Conductivity)

The surface resistance of the conductive polymer coated on the glass plate was determined by the 4-terminal method using a resistivity meter (Loresta IP manufactured by Dia Instruments Co., Ltd.)

(Evaluation of Adhesion)

The adhesion was evaluated by a crosscut adhesion test.

The film formed on the PET film was cut into 100 (10×10) squares with a side of 1 mm. A cellophane adhesive tape (with a width of 18 mm) was completely attached to the squares and immediately separated therefrom in an instantaneous manner with one end of the tape maintained at right angles. The number of squares that did not come off but completely remained on the film was counted.

The adhesion was rated "good" when 99 to 100 squares remained and "fair" when 80 to 98 squares remained.

TABLE 3

| | EX 3-1 | EX 3-2 | Ex 3-3 | Ex 3-4 | Ex 3-5 | Ex 3-6 | Ex 3-7 | CE 3-1 | CE 3-2 |
|---|---|---|---|---|---|---|---|---|---|
| Conductive polymer in Synthesis Example 3-1 | 5 | 5 | 5 | 5 | | 5 | | 5 | |
| Conductive polymer in Synthesis Example 3-2 | | | | | 5 | | | | |
| Conductive polymer dispersion in Synthesis Example 3-3 | | | | | | | 82.5 | | |
| Polyaniline powder (commercial product) | | | | | | | | | 0.4 |
| Dodecylbenzenesulfonic acid | | | | | | | | | 0.6 |
| Polyester solution | 17.5 | 17.5 | | | 17.5 | 17.5 | 17.5 | 17.5 | 17.5 |
| Polyurethane solution | | | 17.5 | | | | | | |
| Acrylic monomer | | | | 2 | | | | | |
| Radical polymerization initiator | | | | 0.02 | | | | | |
| Toluene | 77.5 | 77.5 | 77.5 | 93 | 77.5 | 77.5 | | 77.5 | 81.5 |
| Conc. of conductive polymer (wt %) | 1 | 1 | 1 | 1 | 1 | 1 | 1 | 1 | 0.4 |
| Shear rate ($s^{-1}$) | 25000 | 25000 | 15000 | 25000 | 25000 | 11000 | - | 5000 | 25000 |
| Mixing time (min) | 10 | 5 | 5 | 5 | 5 | 15 | 5 | 5 | 5 |
| Long-term stability | Good | Good | Good | Good | Good | Good | Good | Poor | Fair |
| Appearance | Good | Good | Good | Good | Good | Good | Good | Poor | Fair |
| Fibril diameter (nm) | 30 | 20 | 50 | 60 | 20 | 50 | 80 | 5000 | - |
| Total light transmittance (%) | 85 | 88 | 88 | 86 | 88 | 89 | 88 | 92 | 88 |
| Surface resistance (Ω/sq.) | 1.8E+04 | 4.2E+05 | 5.1E+05 | 3.7E+04 | 3.2E+05 | 6.1E+06 | 1.2E+06 | 1.5E+09 | 3.2E+08 |
| Adhesion | Good | Good | Fair | Good | Good | Good | Good | Good | Good |

The item "Conc. of conductive polymer" in Table 3 refers to the concentration of the conductive polymer (solid matter) in each conductive coating.

The following components were used in Examples and Comparative Examples.

Polyaniline powder: available from Aldrich; weight-average molecular weight: 10,000

Polyester solution: solution obtained by mixing polyester (VYLON 240 available from Toyobo Co., Ltd.) and MEK at a weight ratio of 40/100

Polyurethane solution: solution obtained by mixing polyurethane (Pandex 1520 available from Dainippon Ink and Chemicals, Inc.) and toluene at a weight ratio of 40/100

Acrylic monomer: pentaerythritol acrylate M-305 available from Toagosei Co., Ltd.

Radical polymerization initiator: 4,4-azobis(4-cyanovaleric acid), Irgacure 500 available from Ciba-Geigy Ltd.

The film obtained from each conductive coating was observed using an optical microscope at a magnification of 400×. As a result, a fibrillar conductive polymer with a fibril diameter of 5,000 nm (5 μm) was observed in Comparative Example 3-1, whereas the conductive polymer in Comparative Example 3-2 was not in a fibrillar shape but remained aggregated and therefore the fibril diameter was not measured. No conductive polymer could be seen in any of Examples 3-1 to 3-7, presumably because the conductive polymers in Examples 3-1 to 3-7 were in the shape of extremely fine fibrils and uniformly dispersed.

Then, the films in Examples 3-1 to 3-6 were observed by TEM at a magnification of 1000×. As a result, uniformly dispersed, fibrillar conductive polymers were observed.

Figure 3:
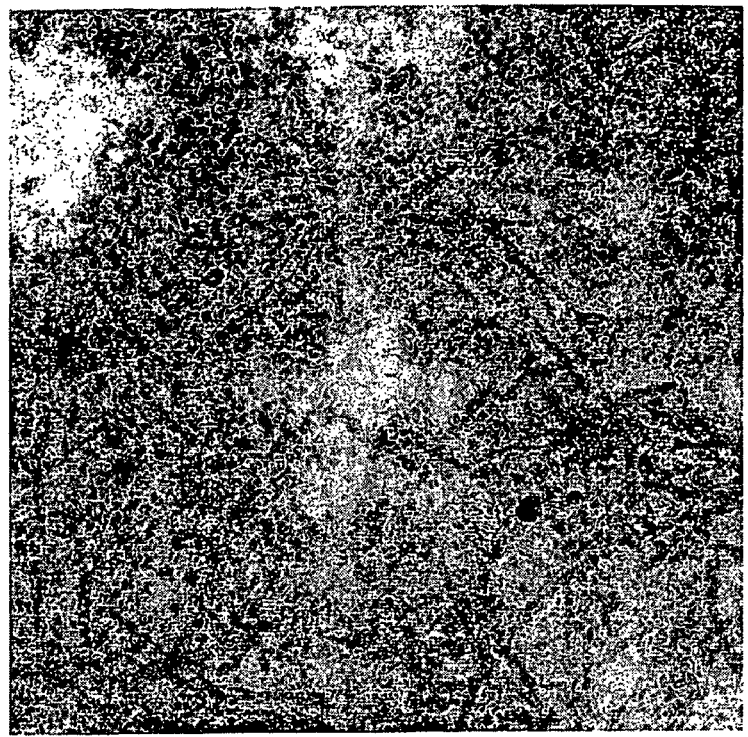
FIG. 3 shows a TEM image (at 1,000×) of Example 3-2.
Figure 4:
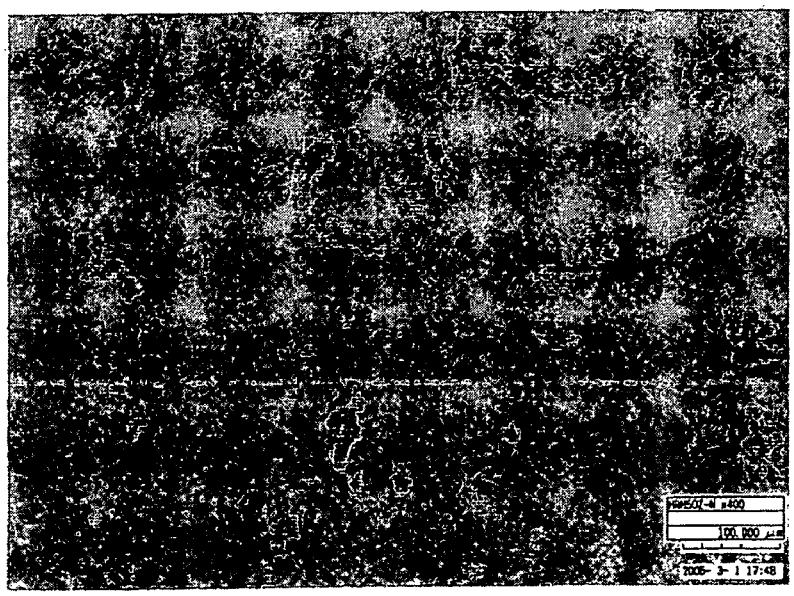
FIG. 4 shows an optical microscope image (at 400×) of Comparative Example 3-1.

FIG. 3 shows a TEM image of Example 3-2 (at a magnification of 1000×) and FIG. 4 shows an optical micrograph of Comparative Example 3-1 (at a magnification of 400×).

As is also clear from the results shown in Table 3, the conductive coating (in Comparative Example 3-1) obtained by stirring at a shear rate of 5,000 $s^{-1}$ could not have a sufficiently finely divided conductive polymer and was poor in long-term stability, appearance and conductivity. The conductive coating (in Comparative Example 3-2) that used polyaniline powder with a weight-average molecular weight of 10,000 did not have a fibrillated conductive polymer and was comparatively poor in long-term stability, appearance and conductivity.

On the other hand, Examples 3-1 to 3-7 exhibited excellent long-term stability, appearance, transparency, conductivity and adhesion.

The invention claimed is:

1. A process for producing a fibrillar conductive polymer comprising a stirring step for stirring with an agitator a liquid mixture containing conductive polymer aggregates and a solvent to obtain the fibrillar conductive polymer with a fibril diameter of not more than 100 nm, wherein the conductive polymer has a weight-average molecular weight of 20,000 to 1,000,000, the liquid mixture is stirred at a shear rate of at least 10,000 $s^{-1}$ to obtain the fibrillar conductive polymer and the agitator is a high-speed agitator in which a rotary shaft is concentrically provided within a cylindrical agitation vessel and a rotary blade with a slightly smaller diameter than the agitation vessel is attached to the rotary shaft and is rotated at a high speed to stir a liquid mixture so that a cylindrical thin film of the liquid mixture is enlarged on an inner surface of the agitation vessel, and wherein the rotary blade has, on its circumferential side, a porous cylindrical portion having a cylindrical body radially perforated with a large number of small holes.

2. The process for producing the fibrillar conductive polymer according to claim 1, wherein the conductive polymer aggregates comprises polyaniline and/or a polyaniline derivative.

3. The process for producing the fibrillar conductive polymer according to claim 1, wherein the conductive polymer aggregates are not dried.

4. The process for producing the fibrillar conductive polymer according to claim 1, wherein the content of the conductive polymer aggregates in the liquid mixture is not more than 10 wt %.

5. The process for producing the fibrillar conductive polymer according to claim 1, wherein the liquid mixture contains a surfactant.

6. The process for producing the fibrillar conductive polymer according to claim 1, comprising, prior to the stirring step, a conductive polymer production step in which a monomer, an oxidant and a solvent are mixed together to polymerize the monomer, thus obtaining the conductive polymer aggregates.

7. A fibrillar conductive polymer with a fibril diameter of not more than 100 nm obtained by the process for producing the fibrillar conductive polymer according to claim 1.

8. A fibrillar conductive polymer dispersion having the fibrillar conductive polymer according to claim 7 dispersed in a solvent.

9. A process for producing a conductive coating comprising adding a binder to the fibrillar conductive polymer dispersion according to claim 8 to obtain the conductive coating having the fibrillar conductive polymer and the binder dispersed in the solvent.

* * * * *